(12) United States Patent
Muraoka et al.

(10) Patent No.: US 7,515,590 B2
(45) Date of Patent: Apr. 7, 2009

(54) MOBILE COMMUNICATION SYSTEM AND METHOD THEREOF

(75) Inventors: Kazuhiro Muraoka, Yokohama (JP); Yoshiyuki Seguchi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 600 days.

(21) Appl. No.: 11/237,715

(22) Filed: Sep. 29, 2005

(65) Prior Publication Data

US 2006/0018296 A1 Jan. 26, 2006

Related U.S. Application Data

(63) Continuation of application No. PCT/JP03/05958, filed on May 13, 2003.

(51) Int. Cl.
*H04L 12/28* (2006.01)
*H04L 12/56* (2006.01)
*G06F 15/173* (2006.01)

(52) U.S. Cl. ....................... 370/392; 709/242
(58) Field of Classification Search ................ 370/466, 370/467, 468, 469, 349
See application file for complete search history.

(56) References Cited

U.S. PATENT DOCUMENTS

2002/0059433 A1* 5/2002 Oh ............................. 709/227
2003/0005459 A1 1/2003 Sawada ...................... 725/109
2003/0225900 A1* 12/2003 Morishige et al. ........... 709/230

FOREIGN PATENT DOCUMENTS

| JP | 2001-189742 | 7/2001 |
|---|---|---|
| JP | 2002-016636 | 1/2002 |
| JP | 2002-033764 | 1/2002 |

(Continued)

OTHER PUBLICATIONS

Masayuki Yamai, "ARP/DHCP/BOOTP/Unicast/Broadcast/Mailing List Server/OSPF/RFC1112/IGMP/ICMP/Multicast implementation/UDP transmission and reception experiment/IP multicast transmission program", Open Design, CQ Publishing Co., Ltd., vol. 4, No. 5, Oct. 1, 1997, pp. 38-67, English translation pp. 1-50.

(Continued)

*Primary Examiner*—Daniel J Ryman
*Assistant Examiner*—Christopher Crutchfield
(74) *Attorney, Agent, or Firm*—Staas & Halsey LLP

(57) ABSTRACT

An IP network system includes an IP network divided into a plurality of segments, an MN (mobile node) whose a Care of address is set for each segment where it is located, and a CN (corresponding node) which is a communication partner of the MN. The IP network system further includes a Care of Address managing unit for managing at least an old Care of Address set in a segment before movement of the MN and a new Care of Address set in another segment after movement of the MN, a packet receiving unit receiving a packet addressed to the old Care of Address at least after the MN is relocated to the another segment, the packet being transmitted from the CN, and a packet transfer unit transferring the packet addressed to the old Care of Address to the new Care of Address managed by the Care of Address managing unit, the packet addressed to the old Care of Address being received by the packet receiving unit.

6 Claims, 21 Drawing Sheets

FOREIGN PATENT DOCUMENTS

| JP | 2002-185520 | 6/2002 |
| JP | 2003-51841 | 2/2003 |
| JP | 2003-051841 | 2/2003 |

OTHER PUBLICATIONS

Charles Perkin et al., "Route Optimization in Mobile IP", draft-ietf-mobileip-optim-10.txt, Nov. 15, 2000, pp. 1-27.

Shinji Abe et al., "An Experiment on the procedure of maintaining route optimization in Mobile IP", NTT Network Service Systems Laboratories, NTT Corporation, Network Laboratories, NTT, DoCoMo., Inc., Aug. 29, 2001 (p. 139).

Norio Takahashi et al., "An Experiment on the procedure of route optimization in Mobile, IP", NTT Network Service Systems Laboratories, NTT Corporation, Network Laboratories, NTT, DoCoMo., Inc., Aug. 29, 2001 (p. 140).

Arata Sawai et al., "A Study on Route Optimization in Mobile IP with Pre-Registration and Post-Registration Method", Faculty of Information, Shizuoka University, Nagoya Municipal Industrial Research Institute, University of Hamamatsu, Aug. 29, 2001 (p . 141).

International Serach Report dated Jun. 17, 2003.

Masayuki Yamai, "Saishin TCP/IP no Oyo Gijutsu Dai 2 Sho IP Mult Cast," Open Design, CQ Publishing Co., Ltd., vol. 4, No. 5, Oct. 1, 1997, pp. 38-67.

Charles Perkin et al., "Route Optimization in Mobile IP," draft-ietf-mobileip-optim-10.txt, Nov. 15, 2000.

Shinji Abe et al., "Mobile IP ni Okeru Saiteki Keiro Koshin Hoho ni Kansuru Hyoka," 2001 Nen The Insitute of Electronics, Information and Communication Engineers Society Taikai B-6-83, Aug. 29, 2001.

Norio Takahashi et al., "Mobile ni Okeru Keiro Saitekika Handan Hoho ni Kansuru Hyoka," 2001 Nen The Institute of Electronics, Information and Communication Engineers Society Taikai B-6-84, Aug. 29, 2001.

Arata Sawai et al., "Baaiwake ni yoru Mobile IP Keiro Saitekika ni Okeru Jizen Jigo Toroku Hoshiki no Kento," 2001 Nen The Institute of Electronics, Information and Communication Engineers Society Taikai B-6-85, Aug. 29, 2001.

* cited by examiner

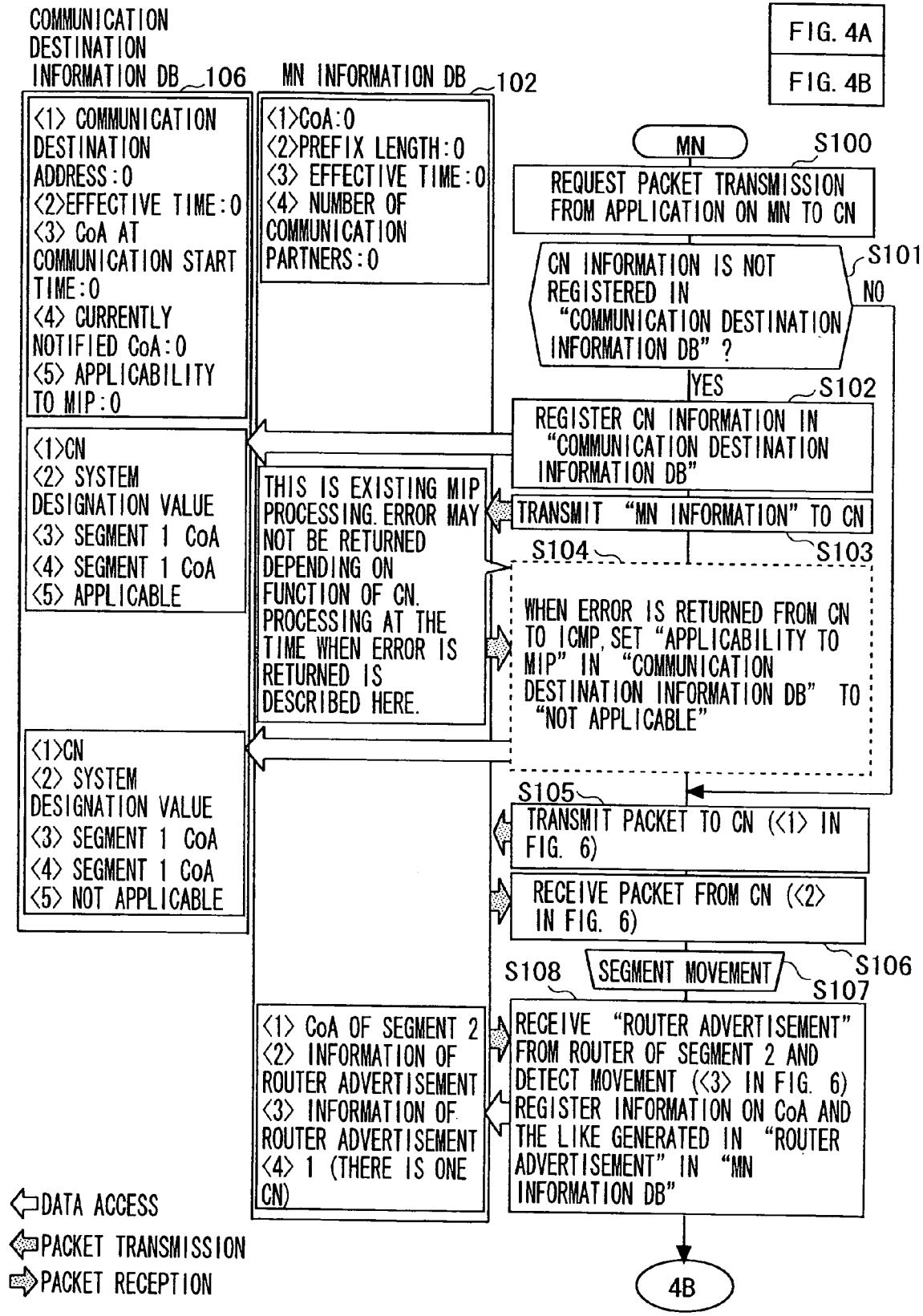

FIG. 5B

EMBODIMENTS OF METHOD OF SPECIFYING NOTIFICATION DESTINATION ADDRESS OF "MOVEMENT DESTINATION MN INFORMATION"

| IN CASE OF EMBODIMENT 2 | IN CASE OF EMBODIMENT 3 |
|---|---|
| S110d: EXTRACT INFORMATION ON SEGMENT WHERE CN IS LOCATED FROM PREFIX OF CN ADDRESS OF COMMUNICATION DESTINATION DB AND GENERATE DESTINATION ADDRESS | S110h: EXTRACT NOTIFICATION DESTINATION SEGMENT INFORMATION FROM PREFIX OF CoA AT COMMUNICATION START TIME OF COMMUNICATION DESTINATION DB AND GENERATE DESTINATION ADDRESS |
| S110e: SET CoA COMMUNICATING WITH THE CN AS INFORMATION CORRESPONDING TO HOME ADDRESS OF MOVEMENT DESTINATION INFORMATION NOTIFICATION (BU/Reg-Reg) TO HA | S110g: SET CoA AT COMMUNICATION START TIME AS INFORMATION CORRESPONDING TO HOME ADDRESS OF MOVEMENT DESTINATION INFORMATION NOTIFICATION (BU/Reg-Reg) TO HA |
| S110f: AS CoA AFTER MOVEMENT, EFFECTIVE TIME, AND THE LIKE, SET SAME INFORMATION AS MOVEMENT DESTINATION INFORMATION NOTIFICATION (BU/Reg-Reg) TO HA | S110i: AS CoA AFTER MOVEMENT, EFFECTIVE TIME, AND THE LIKE, SET SAME INFORMATION AS MOVEMENT DESTINATION INFORMATION NOTIFICATION (BU/Reg-Reg) TO HA |

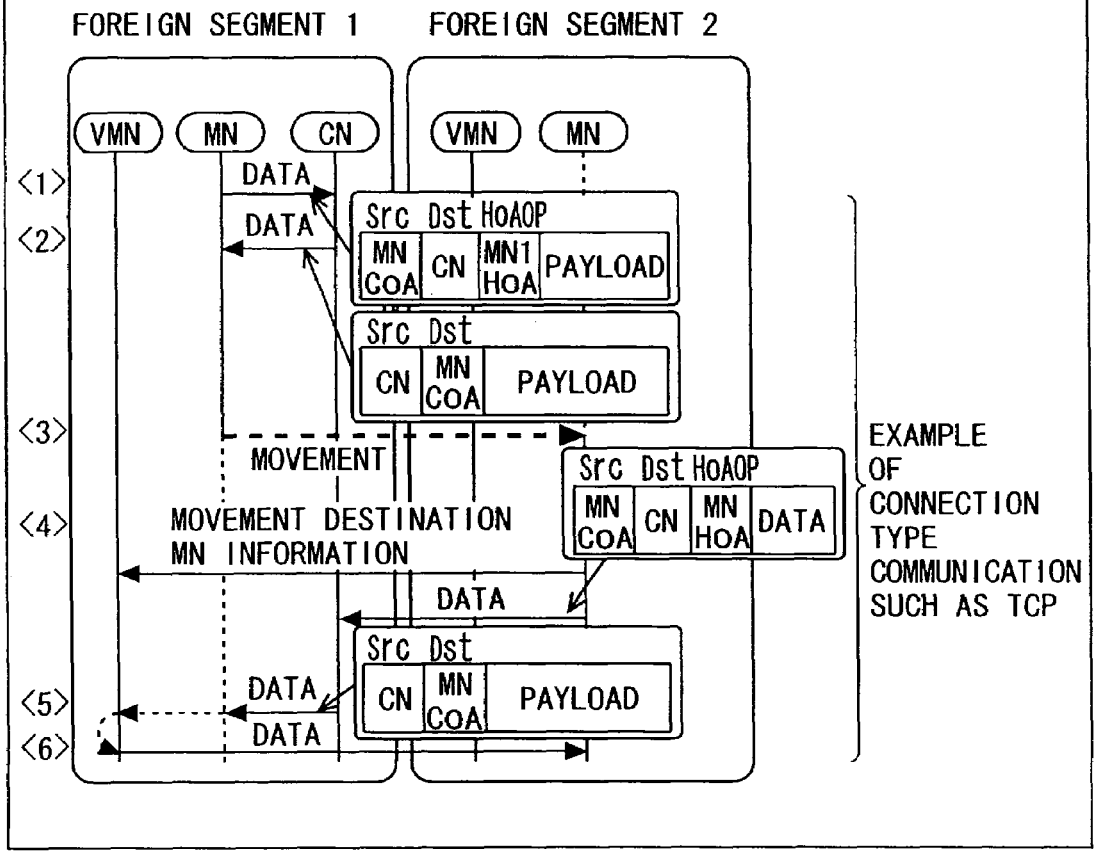

⟨1⟩ VMN INFORMS VMN INFORMATION, AND MN, WHICH HAS RECEIVED THE VMN INFORMATION, HOLDS THE INFORMATION.
THEREAFTER, MN UPDATES HELD CONTENTS ON THE BASIS OF INFORMATION TRANSMITTED FROM VMN.
⟨2⟩ IN STARTING COMMUNICATION WITH CN, TRANSMIT MN INFORMATION TO CN.
⟨3⟩ TRANSMIT DATA PACKET FROM MN TO CN.
⟨4⟩ RETURN RESPONSE PACKET FROM CN TO MN.
⟨5⟩ DETECT MOVEMENT AND NOTIFY HA OF MN INFORMATION OF MOVEMENT DESTINATION.
⟨6⟩ RECEIVE INFORMATION INFORMED BY NEW VMN IN NEW SEGMENT
AND MN, WHICH HAS RECEIVED THE INFORMATION, ADDS THE INFORMATION TO VMN INFORMATION.
⟨7⟩ RECEIVE NOTIFICATION RESPONSE PACKET FROM HA.
⟨8⟩ NOTIFY VMN REGISTERED IN VMN INFORMATION OF NEW CoA AND KEY CoA NOTIFIED TO THE VMN.
VMN RECEIVES THIS INFORMATION AND UPDATES MN INFORMATION HELD BY VMN.
⟨9⟩ NOTIFY CN OF MOVEMENT DESTINATION MN INFORMATION.
⟨10⟩ TRANSMIT DATA PACKET FROM MN TO CN.
⟨11⟩ RETURN RESPONSE PACKET FROM CN TO MN.  SINCE
DESTINATION ADDRESS AT THIS POINT IS OLD CoA, RESPONSE PACKET IS TRANSMITTED
TO SEGMENT OF TRANSMISSION DESTINATION ADDRESS.
⟨12⟩ VMN RECEIVES THE PACKET AND TRANSFER THE PACKET TO LATEST CoA.

FIG. 15A
PRIOR ART

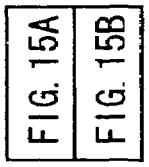

WHEN CN, WHICH DOES NOT SUPPORT MOBILE IP FUNCTION, STARTS COMMUNICATION WITH MN
<1> TRANSMIT PACKET FROM CN TO HOME ADDRESS OF MN.
<2> HA RECEIVES PACKET ADDRESSED TO MN, ENCAPSULATES BASE PACKET ON THE BASIS OF MN INFORMATION, AND TRANSFERS THE PACKET
<3> DETECT THAT THE PACKET IS RECEIVED THROUGH REDUNDANT ROUTE AND NOTIFY TRANSMISSION SOURCE OF MN INFORMATION OF TRANSMISSION DESTINATION
<4> RETURN RESPONSE TO RECEIVED DATA, IN COMMUNICATION BETWEEN CN AND MN, THE ABOVE IS REPEATED. HOWEVER, AFTER CN NOTIFIES THAT "MN INFORMATION NOTIFICATION" AND "HoA OPTION" (HEREINAFTER HoA OP) ARE NOT SUPPORTED, TRANSMISSION THEREOF AND GRANT OF OPTION MAY NOT BE PERFORMED.
<5> NOTIFY HA OF MOVEMENT DESTINATION MN INFORMATION
<6> RECEIVE NOTIFICATION RESPONSE FROM HA
<7> NOTIFY CN OF MOVEMENT DESTINATION MN INFORMATION (SAME AS <4>)
<8> SAME AS <1>
<9> SAME AS <3>

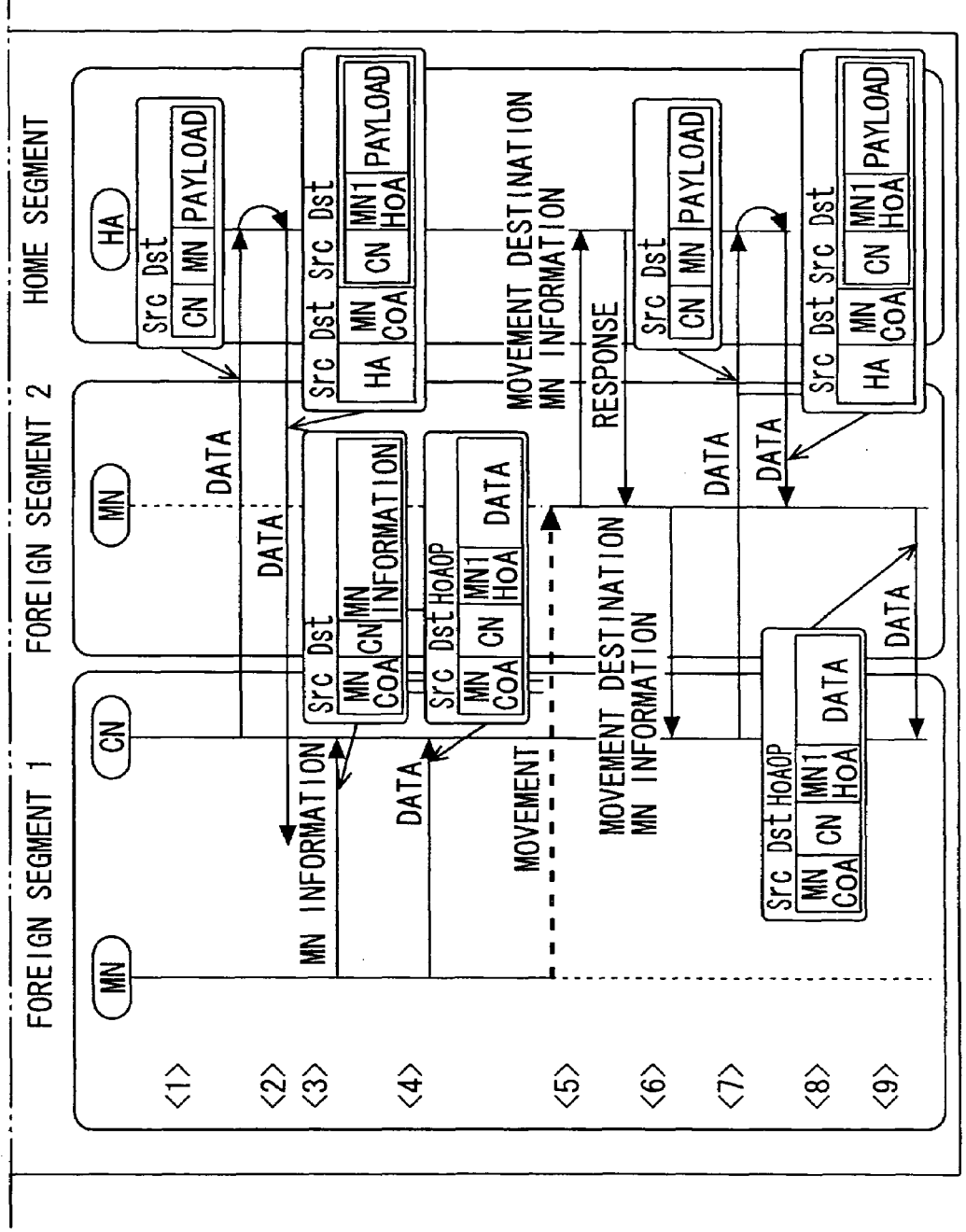

WHEN MN, WHICH DOES NOT SUPPORT MOBILE IP FUNCTION, STARTS COMMUNICATION WITH CN
<1> TRANSMIT MN INFORMATION AT COMMUNICATION START TIME
<2> SET CoA AS TRANSMISSION SOURCE ADDRESS AND TRANSMIT PACKET TO WHICH HoAOP IS GRANTED, IN COMMUNICATION BETWEEN CN AND MN, THE ABOVE IS REPEATED.
HOWEVER, AFTER CN NOTIFIES THAT "MN INFORMATION NOTIFICATION" AND "HoA OPTION" (HEREINAFTER HoA OP) ARE NOT SUPPORTED, TRANSMISSION THEREOF AND GRANT OF OPTION MAY NOT BE PERFORMED.
<3> SINCE CN CANNOT PROCESS HoAOP, RETURN RESPONSE TO SOURCE ADDRESS (CoA) OF RECEIVED PACKET
<4> NOTIFY HA OF MOVEMENT DESTINATION MN INFORMATION
<5> RECEIVE NOTIFICATION RESPONSE FROM HA
<6> NOTIFY CN OF MOVEMENT DESTINATION MN INFORMATION (SAME AS <2>)
<7> TRANSMIT PACKET WITH NEW CoA SET AS TRANSMISSION SOURCE ADDRESS
<8> RETURN RESPONSE TO PARTNER ADDRESS (OLD CoA) UPON CONNECTION GENERATION. COMMUNICATION CANNOT BE CONTINUED BECAUSE MN IS NOT PRESENT IN OLD SEGMENT

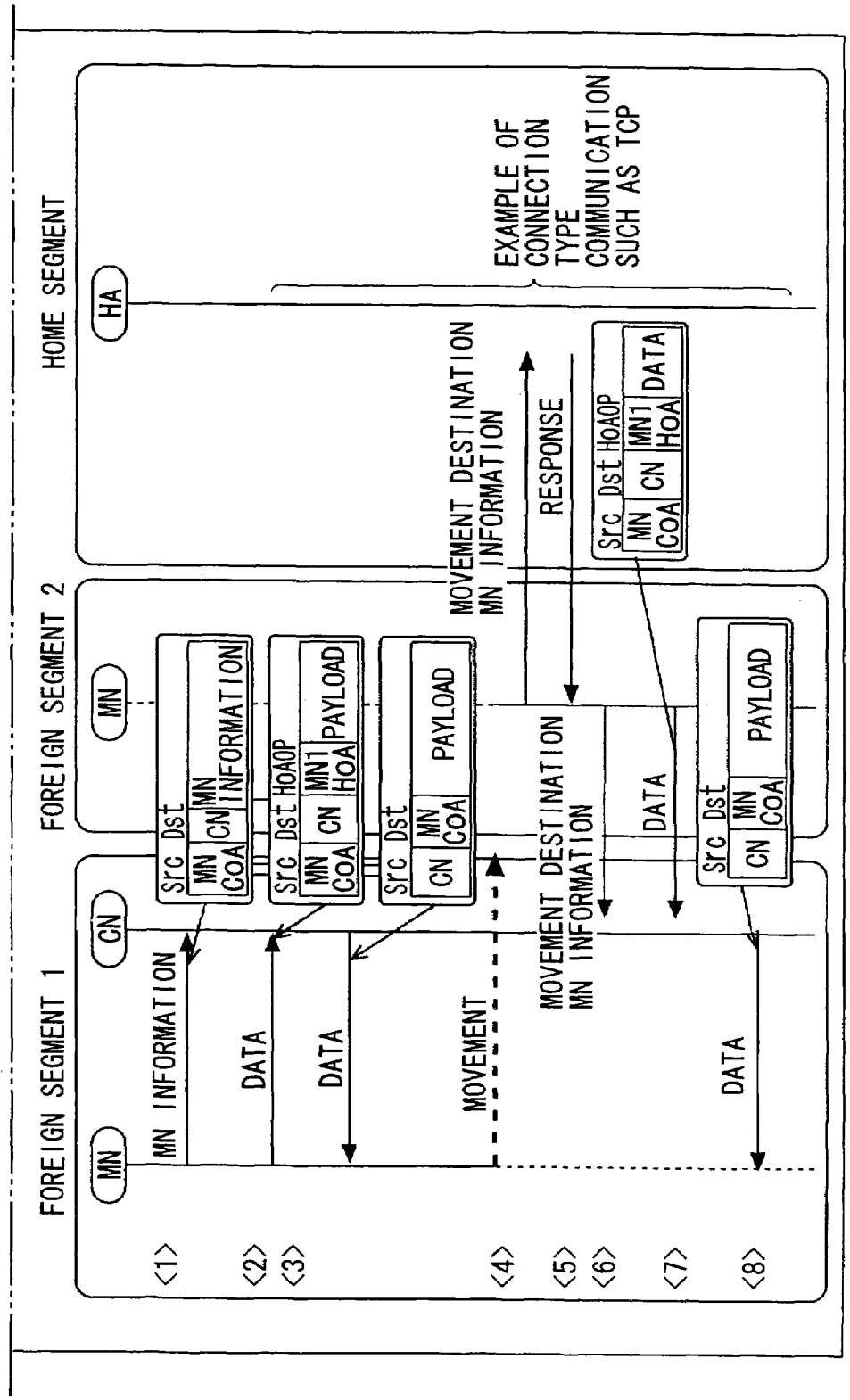

MOBILE COMMUNICATION SYSTEM AND METHOD THEREOF

CROSS-REFERENCE TO RELATED APPLICATION

This is a continuation of Application PCT/JP2003/005958, filed on May 13, 2003, now pending, the contents of which are herein wholly incorporated by reference.

BACKGROUND OF THE INVENTION

1. Field of the Present Invention

The present invention relates to maintenance of connectivity between a mobile node and other nodes involved in a movement of the mobile node in a mobile network environment.

2. Description of the Related Art

In recent years, researches have been conducted on a mobile IP, which is a technique for allowing a moving terminal to maintain IP communication regardless of a position of the terminal. Recently, there have been many cases where companies and organizations carry out demonstration tests, and provides the service through hot spots and the like. Standardization of the mobile IP has already been promoted in the field of IPv4. At present, standardization organizations such as the IETF have actively discussed to realize the mobile IP based on IPv6.

However, a mobile IP function is not implemented in all IP devices. It is expected that a chip mounted with a simplified IP stack having a minimum IP function will be implemented in small-sized portable terminals, devices that do not perform IP communication frequently, and the like. Also, there are some of the devices currently used that will not have the mobile IP function additionally implemented.

In such cases, only with the implementation of the mobile IP function that is currently discussed in the standardization organizations, a node not supporting the mobile IP function and a mobile node supporting the mobile IP function cannot communicate with each other in some cases Thus, means for solving this problem is required.

There is a mobile IP technique as a technique taking into account convenience at the time when an IP node moves from one segment to which the IP node belongs to another. As the mobile IP technique, those for IPv4 and IPv6 have been laid open to public, and respectively defined in RFC2002, draft-ietf-mobileip-vipv6, and the like.

In addition, several patents have been laid open to the public in order to supplement these techniques.

For example, there is disclosed a technique concerning speed-up of packet transfer path switching following movement and optimization of a redundant path for packet transfer following movement, while taking into account compatibility to IP of mobile communication networks (TOKUKAI 2002-185520).

This laid-open patent application discloses a technique for allowing, by using the techniques described above, a MN to perform packet transmission and reception without changing information of the MN's own node when the MN moves from one segment to another. In addition, it is also possible to move from one link to another without suspending communication.

However, these are techniques assuming communication between nodes compatible to the mobile IP function or communication using a "home address (hereinafter, HoA)" of the MN.

In the conventional techniques, as shown in FIG. 15, when a CN sends a connection request to a MN and the CN and the MN communicate with each other using an HoA of the MN, communication is never interrupted following movement of the MN. However, as shown in FIG. 16, in a case where a MN located in a foreign segment sends a connection request to a CN, since the CN, which is a node not supporting the mobile IP function, cannot recognize an HoA Option (hereinafter, HoAOP), the CN starts communication using a Care of Address (hereinafter also referred to as CoA) of the MN. After this connection is established, a destination of a packet to be sent from the CN to the MN is changed to an old CoA of the MN, following segment movement of the MN. Thus, the packet does not reach the MN after the movement and the communication is interrupted.

In general, a MN having a contract with a mobile communication carrier, an ISP, or the like, has a home segment in a segment inside the carrier or the ISP, and the MN never returns to the home segment. When an IP network is established, it is unlikely that the mobile IP function is applicable to all nodes, and may not be applicable to devices mounted with a simplified stack or the like.

Therefore, in daily use, a connection request from a MN to a node not supporting the mobile IP function is communicated using a CoA. As a result, the communication is interrupted following movement of the MN.

For example, in a case where a cellular phone currently used widely is adapted to the IP, when a user attempts to receive music, video, or the like, reception cannot be continued unless a server supports the mobile IP function. As a result, a service cannot be provided.

SUMMARY OF THE INVENTION

It is an object of the present invention to prevent a situation in which, since a destination of a packet to be sent from a CN to a MN is changed to an old CoA of the MN following segment movement of the MN, the packet does not reach the MN after the movement and communication is interrupted.

In order to solve the above-mentioned problems, the present invention provides a network system that includes a network divided into a plurality of segments, a MN (Mobile Node) for which a Care of Address is set for each segment in which the MN is located, and a CN (Corresponding Node) that is a communication partner of the MN, the network system comprising a Care of Address managing unit that manages at least an old Care of Address set in a segment before movement of the MN and a new Care of Address set in another segment after movement of the MN, a packet receiving unit that receives a packet addressed to the old Care of Address, which is transmitted from the CN, at least after the MN is relocated to the another segment, and a packet transfer unit that transfers the packet addressed to the old Care of Address, which is received by the packet receiving unit, to the new Care of Address managed by the Care of Address managing unit.

According to the present invention, the packet transfer unit transfers the packet addressed to the old Care of Address of the MN, which is received by the packet receiving unit, to the new Care of Address of the MN managed by the Care of Address managing unit.

Therefore, it is possible to prevent a situation in which, since a destination of a packet to be sent form a CN to a MN is changed to an old Care of Address (CoA) of the MN following segment movement of the MN, the packet does not reach the MN after the movement and communication is interrupted.

In the network system described above, for example, a VMN (Virtual Mobile Node) including the Care of Address managing unit, the packet receiving unit, and the packet transfer unit, is provided in a specific segment, and the MN further includes a MN information notifying unit that transmits MN information including at least the new Care of Address and the old Care of Address to the specific segment, and the VMN receives the MN information transmitted from the MN information notifying unit and manages the new and old Care of Addresses included in the MN information using the Care of Address managing unit.

As described above, since the MN information is transmitted to the specific segment, the MN is not required to manage (an address of) the VMN in order to transmit the MN information.

In the network system as described above, for example, the MN further includes a movement detecting unit that detects that the MN itself has been relocated to another segment, and the MN information notifying unit transmits the MN information to the specific segment when it is detected by the movement detecting unit that the MN itself has been relocated to another segment.

In the network system as described above, for example, the specific segment is the segment before movement (e.g. a segment in which the MN was located just before it has been located in a current segment).

In the network system as described above, for example, the specific segment is a segment in which the CN is located.

In the network system as described above, for example, the specific segment is a segment in which the MN has located when the MN has started communication with the CN.

In the network system as described above, for example, the MN further includes a packet analyzing unit that extracts a source address from a base packet of a multiple encapsulated packet received from the CN, and the specific segment is a segment in which a transmission source according to the source address extracted by the packet analyzing unit is located.

In the network system as described above, for example, the MN further includes a packet analyzing unit that extracts a destination address from a base packet of a multiple encapsulated packet received from the CN, and the specific segment is a segment in which a transmission destination according to the destination address extracted by the packet analyzing unit is located.

In the network system as described above, for example, a VMN including the Care of Address managing unit, the packet receiving unit, and the packet transfer unit, is provided in a specific segment, the MN further includes a managing unit that manages VMN information including at least an address of the VMN and a MN information notifying unit that transmits MN information including at least the new Care of Address and the old Care of Address to a VMN managed by the managing unit, and the VMN receives the MN information transmitted from the MN information notifying unit and manages the new and old Care of Addresses included in the MN information using the Care of Address managing unit.

As described above, since the VMN information including the address of the VMN is managed, it is possible to transmit the MN information to the VMN.

In the network system as described above, for example, the MN further includes a movement detecting unit that detects that the MN itself has been relocated to another segment, and the MN information notifying unit transmits the MN information to a specific VMN managed by the managing unit when it is detected by the movement detecting unit that the MN itself has been relocated to another segment.

In the network system as described above, for example, the specific VMN is a VMN located in the segment before movement (e.g. a segment in which the MN was located just before it has been located in a current segment).

In the network system as described above, for example, the specific VMN is a VMN located in a segment identical with a segment in which the CN is located.

In the network system as described above, for example, the specific VMN is a VMN located in a segment in which the MN has started communication with the CN.

In the network system as described above, for example, the MN further includes a packet analyzing unit that extracts a source address from a base packet of a multiple encapsulated packet received from the CN, and the specific VMN is a VMN located in a segment identical with a segment in which a transmission source, which is obtained from the source address extracted by the packet analyzing unit, is located.

In the network system as described above, for example, the MN further includes a packet analyzing unit that extracts a destination address from a base packet of a multiple encapsulated packet received from the CN, and the specific VMN is a VMN located in a segment identical with a segment in which a transmission destination according to the destination address extracted by the packet analyzing unit is located.

In the network system as described above, for example, the MN information notifying unit transmits the MN information to a segment in which the CN is located, or a segment in which the MN has located when the MN has started communication with the CN.

In the network system as described above, for example, the MN further includes a packet analyzing unit that extracts a source address and a destination address from a base packet of a multiple encapsulated packet received from the CN, and the MN information notifying unit transmits the MN information to a segment in which a transmission source according to the source address extracted by the packet analyzing unit is located, or a segment in which a transmission destination is located.

In the network system as described above, for example, the MN information notifying unit transmits the MN information to a VMN, which is located in a segment identical with a segment in which the CN is located, or a VMN, which is located in a segment in which the MN has started communication with the CN, both of the VMNs being managed by the managing unit.

In the network system as described above, for example, the MN further includes a packet analyzing unit that extracts a source address and a destination address from a base packet of a multiple encapsulated packet received from the CN, and the MN information notifying unit transmits the MN information to a VMN, which is located in a segment identical with a segment in which a transmission source obtained from the source address extracted by the packet analyzing unit is located, or a VMN, which is located in a segment identical with a segment in which a transmission destination is located, both of the VMNs being managed by the managing unit.

The present invention can also be specified as a VMN (Virtual Mobile Node) as described below.

The VMN is included in a network system, the network system having a network divided into a plurality of segments, a MN (Mobile Node) set a Care of Address for each segment in which the MN is located, and a CN (Corresponding Node) being a communication partner of the MN, the VMN transferring a packet addressed to an old Care of Address of the MN to the MN relocated to another segment, the packet being transmitted from the CN, the VMN comprising a Care of Address managing unit managing at least an old Care of Address set in a segment before movement of the MN and a new Care of Address set in another segment after movement of the MN, a packet receiving unit receiving a packet addressed to the old Care of Address, the packet being transmitted from the CN after the MN is relocated to the another segment, and a packet transfer unit transferring the packet addressed to the old Care of Address to the new Care of Address managed by the Care of Address managing unit, the packet being received by the packet receiving unit.

The present invention can also be specified as an invention of a method as described below.

The method is a packet transferring method used in a network system, the network system having a network divided into a plurality of segments, a MN (Mobile Node) set a Care of Address for each segment in which the MN is located, and a CN (Corresponding Node) being a communication partner of the MN, the packet transferring method transferring a packet addressed to an old Care of Address of the MN to the MN relocated to another segment, the packet being transmitted from the CN, the packet transferring method comprising the steps of managing at least an old Care of Address set in a segment before movement of the MN and a new Care of Address set in another segment after movement of the MN, receiving at least a packet addressed to the old Care of Address, the packet being transmitted from the CN after the MN is relocated to the another segment, and transferring the packet addressed to the received old Care of Address to the new Care of Address.

The present invention can also be specified as an invention of a program as described below.

The program is a computer program, on which a storage medium has stored, the computer program executable by a VMN (Virtual Mobile Node), the VMN being included in a network system, the network system having a network divided into a plurality of segments, a MN (Mobile Node) set a Care of Address for each segment in which the MN is located, and a CN (Corresponding Node) being a communication partner of the MN, the VMN transferring a packet addressed to an old Care of Address of the MN to the MN relocated to another segment, the packet being transmitted from the CN, the computer program performing the steps of managing at least an old Care of Address set in a segment before movement of the MN and a new Care of Address set in another segment after movement of the MN, receiving at least a packet addressed to the old Care of Address, the packet being transmitted from the CN after the MN is relocated to the another segment, and transferring the received packet addressed to the old Care of Address to the managed new Care of Address.

Moreover, the present invention can also be specified as a recording medium, which is readable by an information processing terminal, having recorded therein the program described above. The recording medium includes any of a read-only medium such as a CD-ROM or a DVD-ROM, and a readable/writeable medium such as a CD-RW, a DVD-RAM, a flash memory, or a hard disk device.

BRIEF DESCRIPTION OF THE DRAWINGS

FIG. 6 is a flowchart for mainly explaining schematic operations between the MN and the VMN;

FIG. 15 (FIGS. 15A and 15B) is a flowchart for explaining schematic operations of the conventional IP network system; and FIG. 16 (FIGS. 16A and 16B) is a flowchart for explaining schematic operations of the conventional IP network system.

DESCRIPTION OF THE PREFERRED EMBODIMENTS

An IP network system, which is a first embodiment of the present invention, will be hereinafter explained with reference to the drawings.

First Embodiment (Schematic Configuration of an IP Network System)

Figure 1:
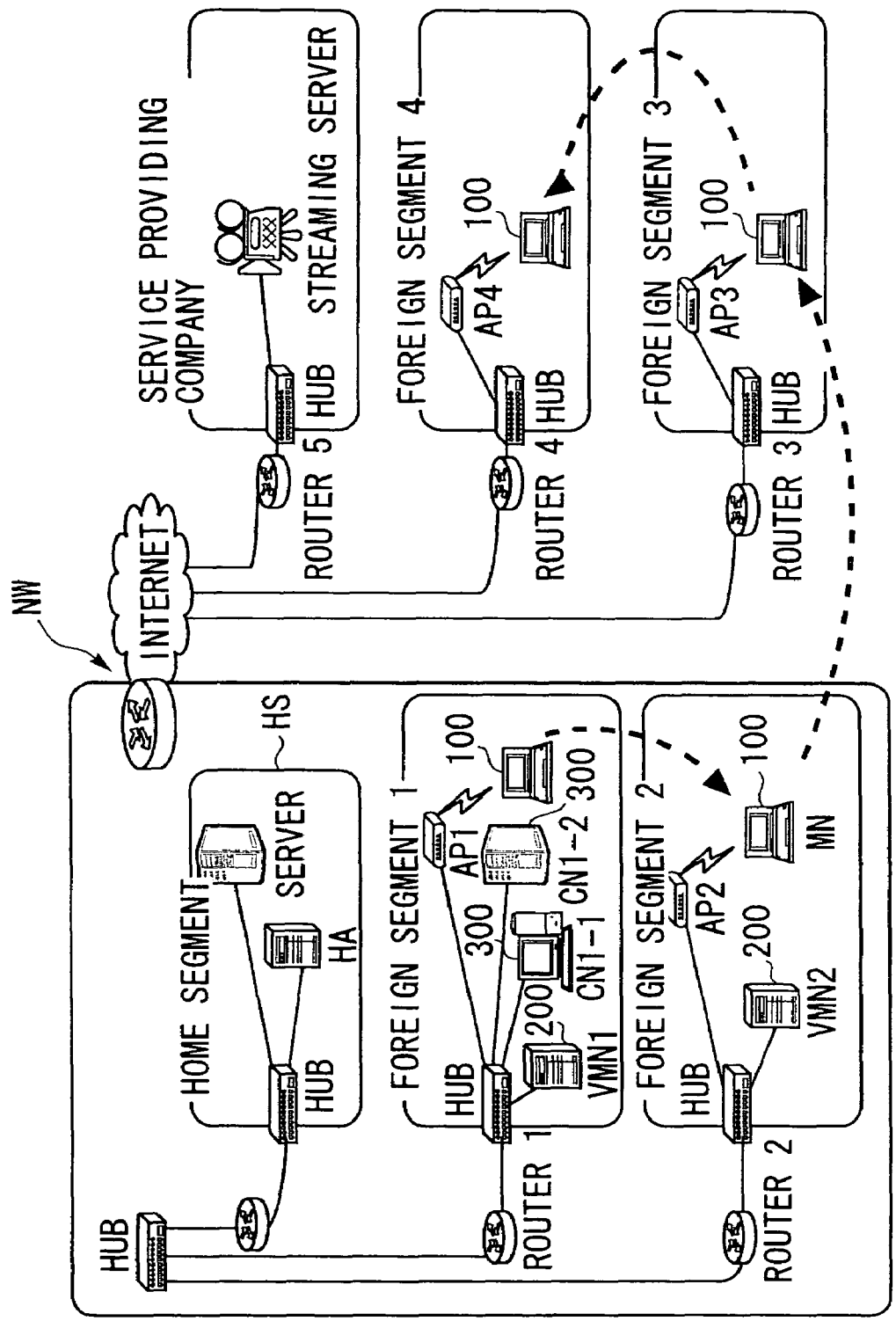
FIG. 1 is a diagram for explaining a schematic system configuration of an IP network system that is an embodiment of the present invention.

FIG. 1 is a diagram for explaining a schematic system configuration of an IP network system that is an embodiment of the present invention.

As shown in the figure, the IP network system of this embodiment includes an IP network NW divided into plural segments such as a home segment HS and foreign segments (hereinafter simply referred to as segments) 1 to 4, a Mobile Node (hereinafter referred to as MN) 100, Virtual Mobile Nodes (hereinafter referred to as VMNs) 200, and nodes (Corresponding Nodes: hereinafter referred to as CNs) 300 that are communication partners of the MN 100.

The respective terminals (the MN 100, the VMNs 200, and the CNs 300) are included in the respective segments 1 to 4 and connected to one another via hubs, routers, and the like. Therefore, the respective terminals are capable of communicating with one another using IP packets (IPv6, IPv4, or and so on) in the respective segments 1 to 4 or among the respective segments 1 to 4.

In this embodiment, an example in which the IP network NW is established according to Mobile IPv6 will be hereinafter explained. Note that the same explanation can be applied to a case in which the IP network NW is established according to Mobile IPv4.

The IP network NW is also connected to the Internet via a router or the like. Therefore, the respective terminals are capable of communicating with various servers on the Internet. For example, the MN 100 is capable of accessing a streaming server on the Internet to reproduce moving image data while acquiring the moving image data from the server.

(Outline of the Mobile IPv6)

The Mobile IPv6 provides a mechanism for continuing communication using an identical IP address even if the MN 100 is relocated (moves) from a home segment HS to the other segments 1 to 4 or the like. For that purpose, an HA (home agent) such as a router is provided in the home segment HS.

When the MN 100 detects that the MN 100 has been relocated (has moved) from the home segment HS to one of the other segments 1 to 4, the MN 100 sets an address (a Care of Address) on the segment at the movement destination and registers the address in the HA. Therefore, the MN 100 transmits a registration request (BU: Binding Update) to the HA. Consequently, the MN informs the HA of a new Care of Address (included as a source address).

When the HA receives the registration request (BU) from the MN 100, the HA registers the Care of Address included in the BU. At the same time, the HA transmits a registration response (BA: binding acknowledgement) to the MN 100 of a transmission source of the registration request.

Thereafter, when the HA receives a packet addressed to the registered MN (a home address is a destination address), the HA encapsulates the packet (a Care of Address is a destination address) and transfers the packet according to tunneling or the like. Consequently, the MN 100 is capable of continuing communication using an identical IP address even if the MN 100 is relocated to another segment.

(Schematic Structure of a MN)

Figure 2:
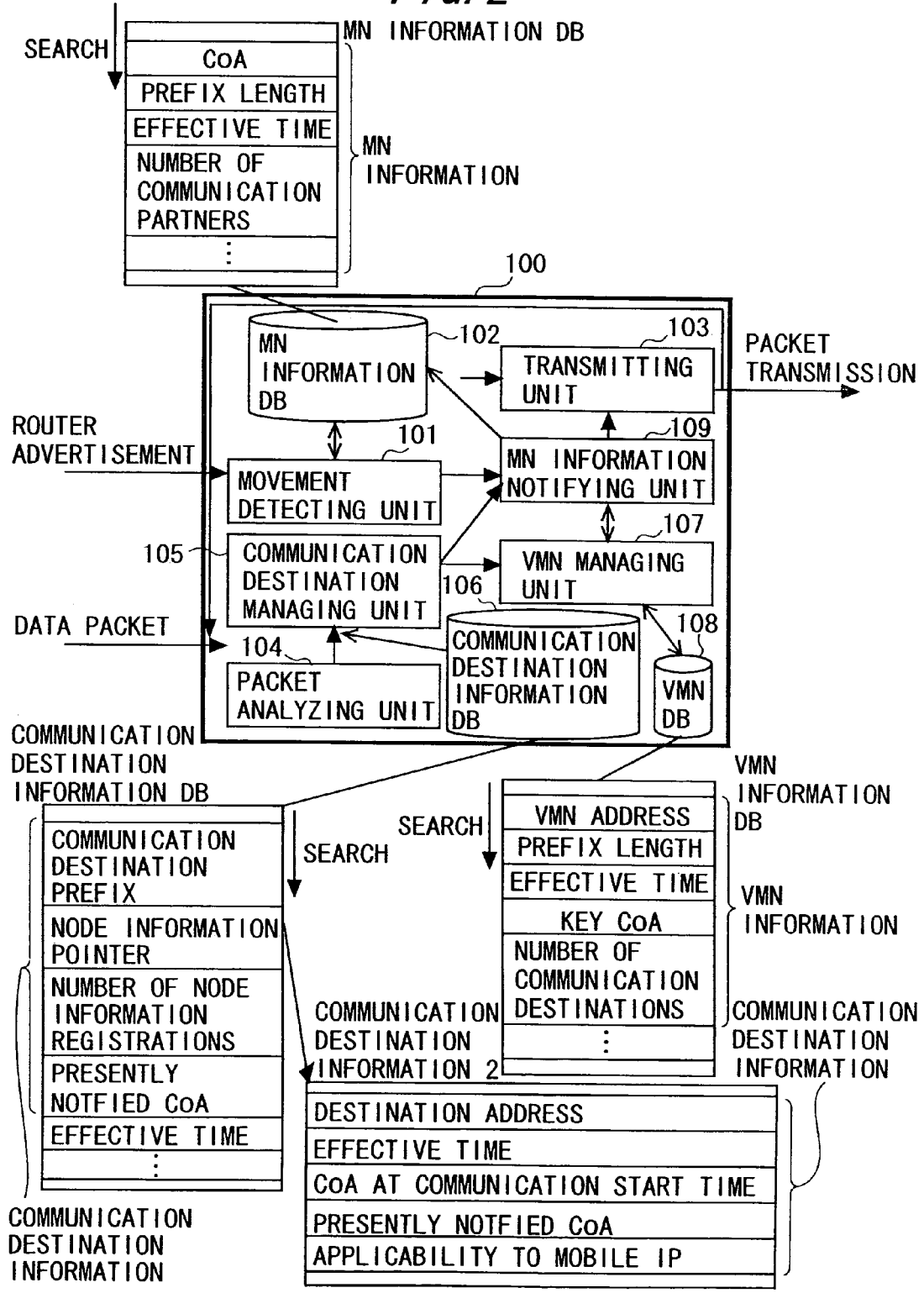
FIG. 2 is a diagram for explaining a schematic structure of a MN included in the IP network system that is an embodiment of the present invention.

FIG. 2 is a diagram for explaining a schematic structure of a MN included in the IP network system that is an embodiment of the present invention.

The MN 100 is a mobile node that is capable of moving among the respective segments 1 to 4 or the like. For example, the MN 100 is an information processing terminal such as a notebook personal computer or a PDA (Personal Digital Assistants) or the like. A Care of Address (CoA) is set for the MN 100 for each segment in which the MN 100 is located (to which the MN 100 belongs). This is existing MIP (Mobile IP) processing.

As shown in FIG. 2, the MN 100 includes a CPU (not shown), which controls operations of the entire MN 100, and movement detecting unit 101, a MN information DB 102, transmitting unit 103, packet analyzing unit 104, communication destination managing unit 105, a communication destination information DB 106, VMN managing unit 107, a VMN DB 108, and MN information notifying unit 109 that are connected to this CPU via a bus or the like. The respective units are realized by various kinds of hardware, programs, and the like provided in the MN 100.

The movement detecting unit 101 (equivalent to a movement detecting unit of the present invention) is unit for detecting that the MN 100 itself has been relocated (has moved) to another segment. In the IP network system of this embodiment, a Routing Advertisement (RA) is notified to the respective segments 1 to 4. Therefore, the movement detecting unit 101 can receive the Routing Advertisement and detect that the MN 100 itself is relocated to another segment according to a change in information of the Routing Advertisement. This is existing MIP (Mobile IP) processing.

When the movement detecting unit 101 detects that the MN 100 itself has been relocated (has moved) to another segment, the movement detecting unit 101 generates a Care of Address according to a prefix or the like included in a Routing Advertisement notified to the another segment and sets the Care of Address as an IPv6 address of the MN 100 itself. Specifically, the movement detecting unit 101 registers the generated Care of Address in the MN information DB 102.

For example, when the MN 100 is located in the segment 1, the MN 100 generates a Care of Address 1 according to a prefix or the like included in a Routing Advertisement notified to the segment 1 and sets the Care of Address 1 as an IPv6 address of the MN 100 itself. The same holds true when the MN 100 is located in the segments 2 to 4.

Consequently, a Care of Address (usually a Care of Address different for each segment) is set for the MN 100 for each segment in which the MN 100 is located. Note that the numeral 1 set to the end of the Care of Address 1 represents a segment for which the Care of Address is set. The same holds true for the Care of Address 2, 3, 4, or the like.

The MN information DB 102 is a database for managing node information of the MN 100 itself. When "MN information" is notified of a movement destination to a segment following handover of the MN 100, the MN information DB 102 holds the notified information.

The MN information DB 102 includes items such as a Care of Address, a prefix length, effective time, and the number of communication partners, etc. A Care of Address generated in a segment, in which the MN 100 is located, is registered in the item of the Care of Address. In the items such as the prefix length, predetermined data obtained from a Routing Advertisement or the like is registered.

The transmitting unit 103 is unit for sending (transmitting) various packets to the IP network NW.

The packet analyzing unit 104 (equivalent to a packet analyzing unit of the present invention) is unit for extracting a destination address, a source address, and the like of a base packet (a packet before encapsulation) from an encapsulated packet.

The communication destination managing unit 105 is unit for managing an address, communication start segment information, and the like of the CN 300 with which the MN 100 itself is communicating. For this management, the communication destination managing unit 105 accesses the communication destination information DB 106.

The communication destination information DB 106 is a database for managing the CN 300 that is currently transmitting and receiving packets. The communication destination information DB 106 is a database in which partial information (CoA information) is added to information that is usually referred to as "Binding information". When the MN 100 transmits a BU (a Reg-Req in Mobile IPv4) to a partner (e.g., the CN 300) with which the MN 100 is communicating directly (not through an HA), information on the partner is stored in the communication destination information DB 106.

The communication destination information DB 106 includes items such as a destination address, effective time, a Care of Address (CoA) at communication start time, a presently notified Care of Address (CoA), and compatibility to MIP.

An IP address of the CN 300 is registered in the destination address. A system designation value is registered in the effective time. A Care of Address at time when communication with the CN 300 is started is registered in the Care of Address at communication start time. A Care of Address at the present time is registered in the presently notified Care of Address.

For example, it is assumed that the MN 100 starts communication with the CN 300 while the MN 100 is located in the segment 1, then, moves to the segment 2, and is located in the segment 2 at the present time. In this case, the Care of Address 1 is registered in the Care of Address at communication start time and the Care of Address 2 is registered in the presently notified Care of Address. Regarding the compatibility to MIP, information about whether the CN 300 supports the mobile IP function is registered.

The VMN managing unit 107 (equivalent to a managing unit of the present invention) is unit for managing information such as an address of the VMN 200 that is held statically or dynamically. For this management, the VMN managing unit accesses the VMN DB 108.

The VMN DB 108 is a database for managing VMN information. The VMN information is information for allowing the MN 100 to perform communication irrespective of the existence of the VMN 200. Information on the VMN 200 located in a segment, in which the MN 100 is located, is stored in the VMN DB 108 according to "VMN notification information" or the like notified from the VMN 200.

The VMN DB 108 includes items such as a VMN address, a prefix length, effective information, a key CoA, and the number of communication destinations. An address of the VMN 200 is registered in the VMN address. This is, for example, an address manually inputted by a user or an address dynamically acquired from the VMN 200 or the like. Besides, predetermined data obtained from the VMN notification information or the like are registered in the items such as the prefix length.

The MN information notifying unit 109 (equivalent to a MN information notifying unit of the present invention) is unit for notifying MN information (including at least a new Care of Address and an old Care of Address of the MN 100) to a segment and a VMN.

(Schematic Structure of a VMN)

Figure 3:
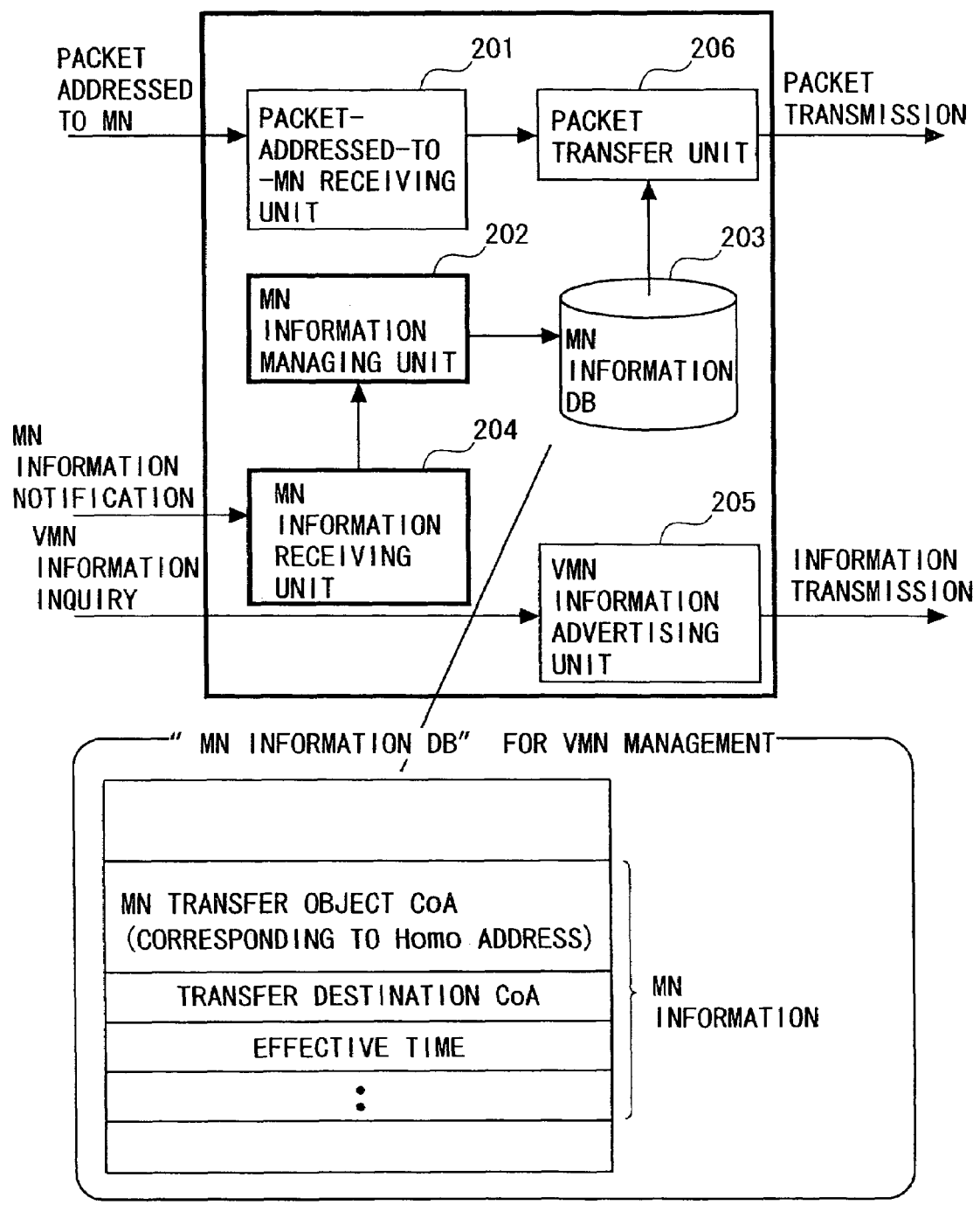
FIG. 3 is a diagram for explaining a schematic structure of a VMN included in the IP network system that is an embodiment of the present invention.

FIG. 3 is a diagram for explaining a schematic structure of a VMN included in the IP network system that is an embodiment of the present invention.

The VMN 200 is a node for receiving an IP packet addressed to an old Care of Address sent from the CN 300 after the MN 100 is relocated (moves) to another segment and transferring this IP packet addressed to a new Care of Address. For example, the VMN 200 is an information processing terminal such as a server. As shown in FIG. 1, in this embodiment, the VMNs 200 are provided in the segment 1 and the segment 2. Note that, as a method of setting the VMN 200, there is a method of operating the VMN 200 on a node in a segment and a method of operating the VMN 200 on a gateway router of a segment. In both the methods, the same means are required.

As shown in FIG. 3, the VMN 200 includes a CPU (not shown), which controls operations of the entire VMN 200, and packet-addressed-to-MN receiving unit 201, MN information managing unit 202, a MN information DB 203, MN information receiving unit 204, VMN information advertising unit 205, and packet transfer unit 206 that are connected to this CPU via a bus or the like. The respective units are realized by various kinds of hardware, programs, and the like provided in the VMN 200.

The packet-addressed-to-MN receiving unit 201 (equivalent to a packet receiving unit of the present invention) is unit for receiving a packet addressed to an old Care of Address of the MN 100 transmitted from the CN 300 at least after the MN 100 is relocated (moves) to another segment.

The MN information managing unit 202 (equivalent to a Care of Address managing unit of the present invention) is unit for managing an old Care of Address set in a segment before movement (also referred to as Care of Address before movement or old CoA), a new Care of Address set in another segment after movement (also referred to as Care of Address after movement or new CoA), effective time of these Care of Addresses (i.e., new and old CoA information of the MN 100), and the like. For this management, the MN information managing unit 202 accesses the MN information DB 203.

The MN information DB 203 is a database in which a moving position is registered for each MN. The MN information DB 203 is equivalent to a database, which is used when an HA or the like holds MN information, but is different in that a CoA for requesting transfer is set in an area equivalent to a Home address. Information is registered in the MN information DB 203 when receiving "movement destination MN information" from the MN 100.

The MN information DB 203 includes items such as a MN transfer object Care of Address (CoA), a transfer destination Care of Address (CoA), and effective time.

An old Care of Address (e.g., the Care of Address 1) set in a specific segment before movement (e.g., a segment to which the MN 100 itself belongs) is set in the MN transfer object Care of Address (CoA). A new Care of Address (e.g., the Care of Address 2) set in another segment after movement is registered in the transfer destination Care of Address (CoA). Effective time of these Care of Addresses (i.e., new and old CoA information of the MN 100) is registered in the effective time. The new and old Care of Addresses and the like are managed during this effective time.

For example, it is assumed that the MN 100 moves from the segment 1 (a specific segment) to the segment 2 (another segment). In this case, the MN information managing unit 202 registers the Care of Address 1 and the Care of Address 2 in the MN information DB 203 as an old Care of Address and a new Care of Address, respectively. This allows packet transfer unit 206 described later to transfer a packet.

The MN information receiving unit 204 is unit for receiving MN information transmitted from the MN 100.

The VMN information advertising unit 205 is unit for notifying VMN information of the VMN 200 itself to a segment in which the VMN 200 itself is located (to which the VMN 200 itself belongs). The VMN information is information that is required when the MN 100 transmits MN information to the VMN 200. For example, the VMN information is an address of the VMN 200 itself, a prefix length, and effective time.

The packet transfer unit 206 (equivalent to a packet transfer unit of the present invention) is unit for transferring a packet addressed to an old Care of Address of the MN 100, which is received by the packet-addressed-to-MN receiving unit 201, to a new Care of Address of the MN 100 managed by the MN information managing unit 202.

(Schematic Structure of a CN)

The CN 300 is a node that has a function for performing communication with the MN 100 but is not compatible to the mobile IP function. For example, the CN 300 is an information processing terminal such as a personal computer or a server. As shown in FIG. 1, in this embodiment, the CNs 300 are provided in the segment 1.

Figure 4B:
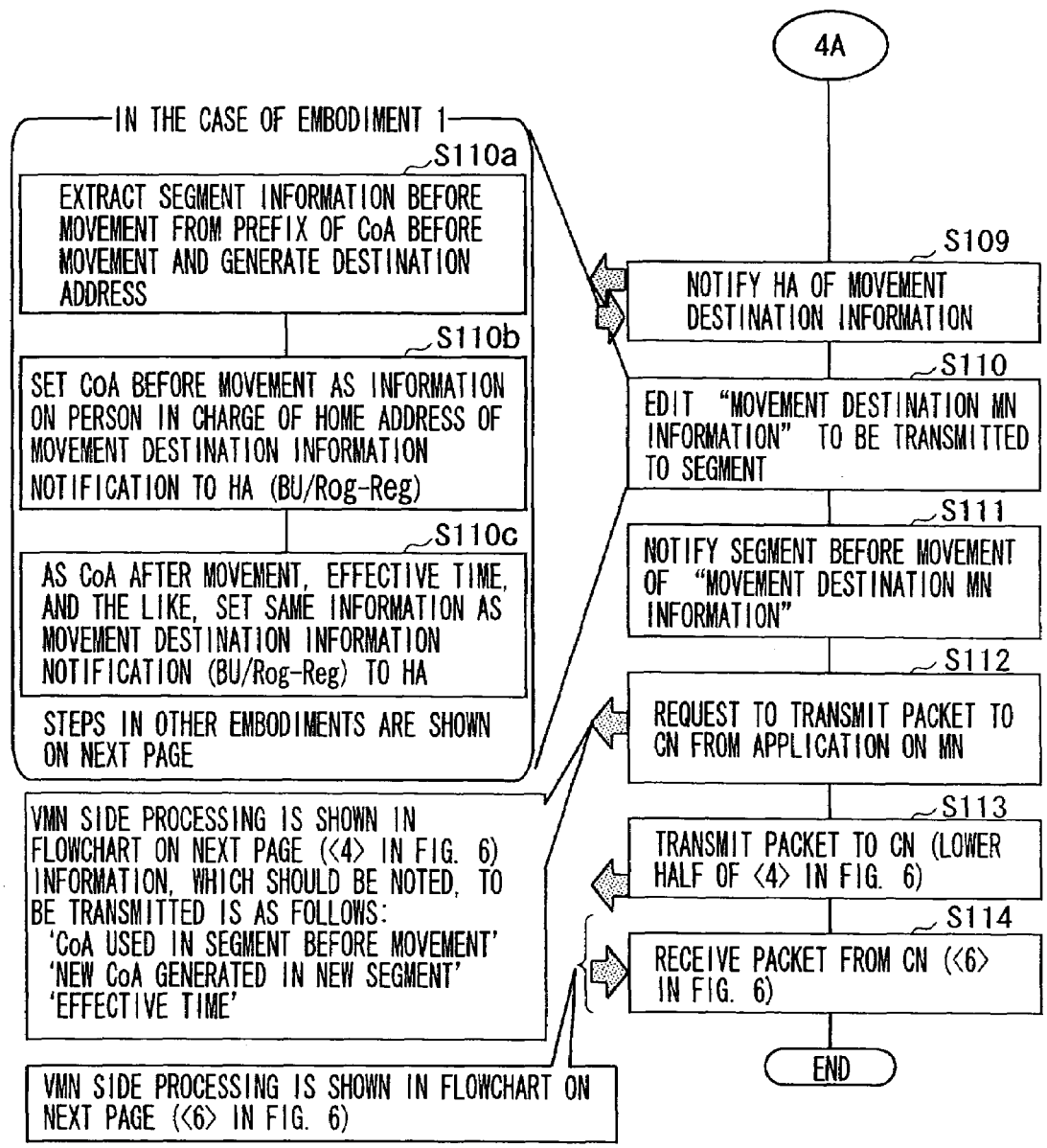
FIG. 4 (FIGS. 4A and 4B) is a flowchart for mainly explaining operations of the MN.
Figure 5A:
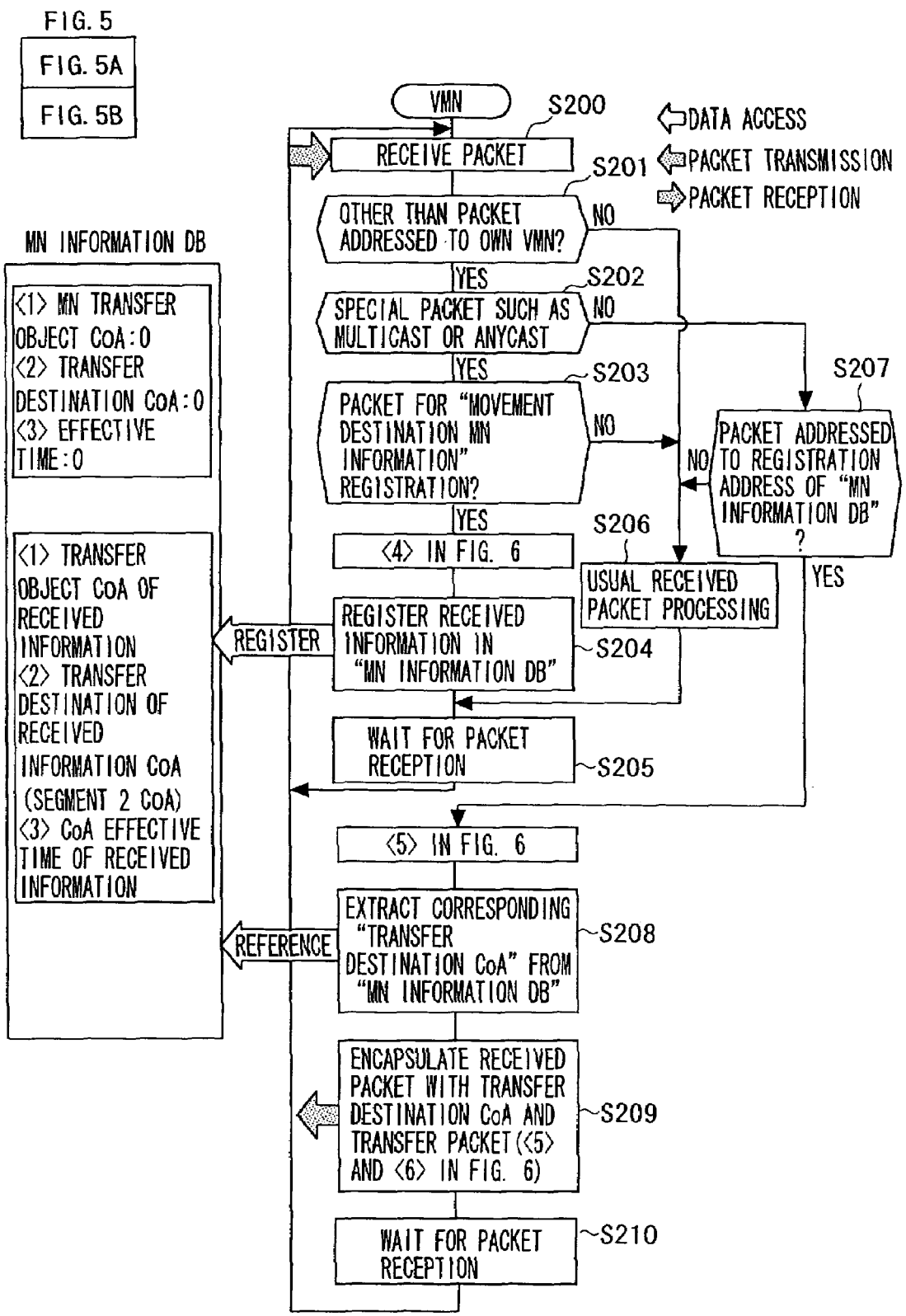
FIG. 5 (FIGS. 5A and 5B) is a flowchart for mainly explaining operations of the VMN.

Operations of the IP network system having the configuration described above will be explained with reference to the drawings. FIG. 4 is a flowchart for mainly explaining operations of a MN. FIG. 5 is a flowchart for mainly explaining operations of a VMN. FIG. 6 is a flowchart for mainly explaining schematic operations between the MN and the VMN.

In an example to be explained below, the MN 100 located in the segment 1 starts communication with the CN 300 located in the same segment and the MN 100 continues the communication even after the MN 100 is relocated (moves) to the segment 2.

(Establishment of Connection)

First, processing until the MN 100 located in the segment 1 establishes connection with the CN 300 located in the same segment will be explained.

In the following explanation, it is assumed that the Care of Address 1, which is generated on the basis of a prefix or the like included in a Routing Advertisement notified to the segment 1 in which the MN 100 is located, is set in the MN 100 as an IPv6 address of the MN 100 itself. In other words, the generated Care of Address 1 or the like is registered in the MN information DB 102.

When a packet transmission request is sent to the CN 300 by unit of a predetermined application (e.g., FTP) that the MN 100 itself is executing (S100), the MN 100 refers to the communication destination information DB 106 and judges whether information on the CN 300 is unregistered (S101).

Since the information on the CN 300 is unregistered at the beginning when communication is started (S101: Yes), the MN 100 registers the information on the CN 300 in the communication destination information DB 106 by executing the communication destination managing unit 104 (S102). Here, an address of the CN 300 (obtained from the predetermined application or the like), a system designation value, a Care of Address at the time when communication with the CN 300 is started (the Care of Address 1 in this context), a Care of Address at the present time (the Care of Address 1 in this context), and "compatible" are registered in the communication destination information DB 106 as the destination address, the effective time, the Care of Address (CoA) at communication start time, the presently notified Care of Address, and the compatibility to MIP, respectively.

Next, the MN 100 acquires MN information from the MN information DB 102 or the like using the MN information notifying unit 109 and transmits this MN information to the CN 300 (S103). In response, since the CN 300 is a node not compatible to the mobile IP, the CN 300 returns Erra of an ICMP (Erra is not returned depending on a function of the CN 300). When Erra is returned, "not compatible" is registered in the communication destination information DB 106 in the compatibility to MIP (S104). This is existing MIP (Mobile IP) processing.

Next, when the MN 100 starts data transmission to the CN 300, an application requesting the data transmission (e.g., the FTP) sends a transmission request designating, as a structure of a packet, an HoA (home address) of the MN 100 and an address of the CN 300 in the source address and the destination address, respectively.

However, since the MN 100 is compatible to the mobile IP function, the MN 100 changes the HoA designated in the source address before transmission to an HoA OP (home address option) and sets the Care of Address 1 in the destination address to send the packet (S105, <1> in FIG. 6). The transmitting unit 103 mainly performs this transmission.

The CN 300, which has received the packet, cannot identify the HoA OP because the CN 300 does not support the mobile IP function. The CN 300 neglects the HoA OP and performs processing (if the CN 300 is the mobile IP function-supporting node, the CN 300 replaces the source address with the HoA OP). Consequently, the CN 300 obtains only the Care of Address 1 of the MN 100 as transmission source information.

Therefore, when the CN 300 returns a response packet for the packet received from the MN 100, the CN 300 sends the response packet to the Care of Address 1 of the MN 100 and the MN 100 receives the response packet (S106, <2> in FIG. 6) (if the CN 300 supports the mobile IP function, the CN 300 gives HoA information of a MN to a path control header). Consequently, connection is established between the Care of Address 1 of the MN 100 and the address of the CN 300.

(Transfer Destination Address Registration Processing; NM Side Processing)

It is assumed that, after the connection is established, the MN 100 is relocated (moves) from the segment 1 to the segment 2 (another segment) (S107, <3> in FIG. 6). In this case, the MN 100 detects that the MN 100 itself has been relocated (has moved) to another segment using the movement detecting unit 101.

For example, the MN 100 (the movement detecting unit 101) receives a Routing Advertisement notified to the segment 2 after the movement and compares MN information and advertisement information at that point to thereby detect that the MN 100 has been relocated (has moved) to another segment (S108). This is existing MIP processing.

When the MN 100 (the movement detecting unit 101) detects that the MN 100 itself has been relocated (has moved) from the segment 1 to the segment 2, the MN 100 generates the Care of Address 2 on the basis of a prefix or the like included in a Routing Advertisement notified to the segment 2 and resets the Care of Address 2 as an IPv6 address of the MN 100 itself.

Specifically, the MN 100 registers the generated Care of Address 2 or the like in the MN information DB 102 (S108) Consequently, a Care of Address (the Care of Address 2 in this context) is set in the MN 100 for each segment in which the MN 100 is located (a segment to which the MN 100 belongs).

When the MN 100 detects that the MN 100 itself has moved from the segment 1 to the segment 2, the MN 100 notifies the HA of "movement destination information" using the MN information notifying unit 109 (S109). This is existing MIP processing. The MN 100 also notifies the CN 300 of the "movement destination MN information". However, since the CN 300 does not support the mobile IP function, the CN 300 cannot process this packet.

Moreover, when the MN 100 detects that the MN 100 itself has been relocated (has moved) from the segment 1 to the segment 2, the MN 100 notifies the segment 1 (the specific segment) before movement of the "movement destination MN information" (S111, <4> in FIG. 6). The movement destination MN information includes the Care of Address 2 (hereinafter referred to as new Care of Address 2), the Care of Address 1 before movement (hereinafter, referred to as old Care of Address 1), a prefix length, and effective time. These are registered in the MN information DB 102.

The MN 100 generates an address to the old segment 1 (an anycast address, etc.), as a destination address of a packet including this movement destination MN information, on the basis of a prefix of the old Care of Address 1 (obtained from the MN information DB 102 or the like) (S110a) and sets this address as a destination address. Then, the MN 100 sets the old Care of Address 1 as information equivalent to a Home address of the movement destination information notification (BU/Reg-Req) to the HA (S110b). The MN 100 sets the same information as the movement destination information notification (BU/Reg-Req) to the HA for the new Care of Address 2, the effective time, and the like (S110c).

The MN 100 sends the packet edited as described above in anycast (i.e., sends the packet to the segment 1 before movement) using the MN information notifying unit 109. Consequently, the old Care of Address 1, the new Care of Address 2, the effective time, and the like are notified to the segment 1 before movement (the specified segment).

(Transfer destination address registration processing; VMN side processing) As shown in FIG. 5, the VMN 200 located in the segment 1 before movement receives (the packet including) the "movement destination MN information", which is notified by the MN 100, using the MN information receiving unit 204 (S200, <4> in FIG. 6). An anycast address set in (the packet including) the "movement destination MN information" (S201: Yes, S202: Yes). Moreover, the anycast address includes (the packet including) the "movement destination MN information" (S203: Yes).

Therefore, the VMN 200 extracts reception information from the received packet and registers the reception information in the MN information DB 203 using the MN information managing unit 202 (S204). Here, the old Care of Address 1, the new Care of Address 2, and effective time obtained from the reception information are registered in the MN information DB 203 as the MN transfer object Care of Address, the transfer destination Care of Address, and the effective time, respectively. This allows the packet transfer unit 206 described later to transfer the packet.

(Transfer Processing by a VMN)

Next, when a packet transmission request is sent to the CN 300 from a predetermined application (e.g., FTP) that the MN 100 itself is executing (S112), as in S105, the MN 100 located in the segment 2 changes an HoA designated in a source address before transmission to an HoA OP and sets the Care of Address 2 in the source address to send the packet (S113) The transmitting unit 103 mainly performs this transmission.

The CN 300, which has received the packet, returns a response packet in relation to the received packet. A destination address at the time of this return is the old Care of Address 1 of the MN 100 that is an address at the time of establishment of connection (<5> in FIG. 6). This is because, since the CN 300 cannot process "movement destination MN information" notification received from the MN 100 (S109), the CN 300 obtains only the Care of Address 1 of the MN 100 as transmission source information.

The VMN 200 set in the segment 1 before movement receives the packet addressed to MN 100 (the packet addressed to the old Care of Address 1) sent from the CN 300 using the packet-addressed-to-MN receiving unit 201 (S200, <5> in FIG. 6). The old Care of Address 1 is set in the packet addressed to the MN 100 as a destination address (S201: Yes, S202: No, S207: Yes). Therefore, the VMN 200 extracts the new Care of Address 2 (movement destination information) corresponding to the old Care of Address 1 from the MN information DB 203 using the packet transfer unit 206 (S208).

The VMN 200 transfers the packet addressed to the MN 100 (addressed to the old Care of Address 1) received from the CN 300 to the new Care of Address 2 (<6> in FIG. 6). Specifically, the VMN 200 encapsulates the packet addressed to the MN 100 (addressed to the old Care of Address 1), which is received from the CN 300, with the new Care of Address 2 and sends the encapsulated packet to the IP network NW.

When the MN 100 receives the encapsulated packet, the MN 100 performs predetermined analysis processing or the like using the packet analyzing unit 104. Thereafter, the processing in S200 to S210 is repeated.

Figure 7:
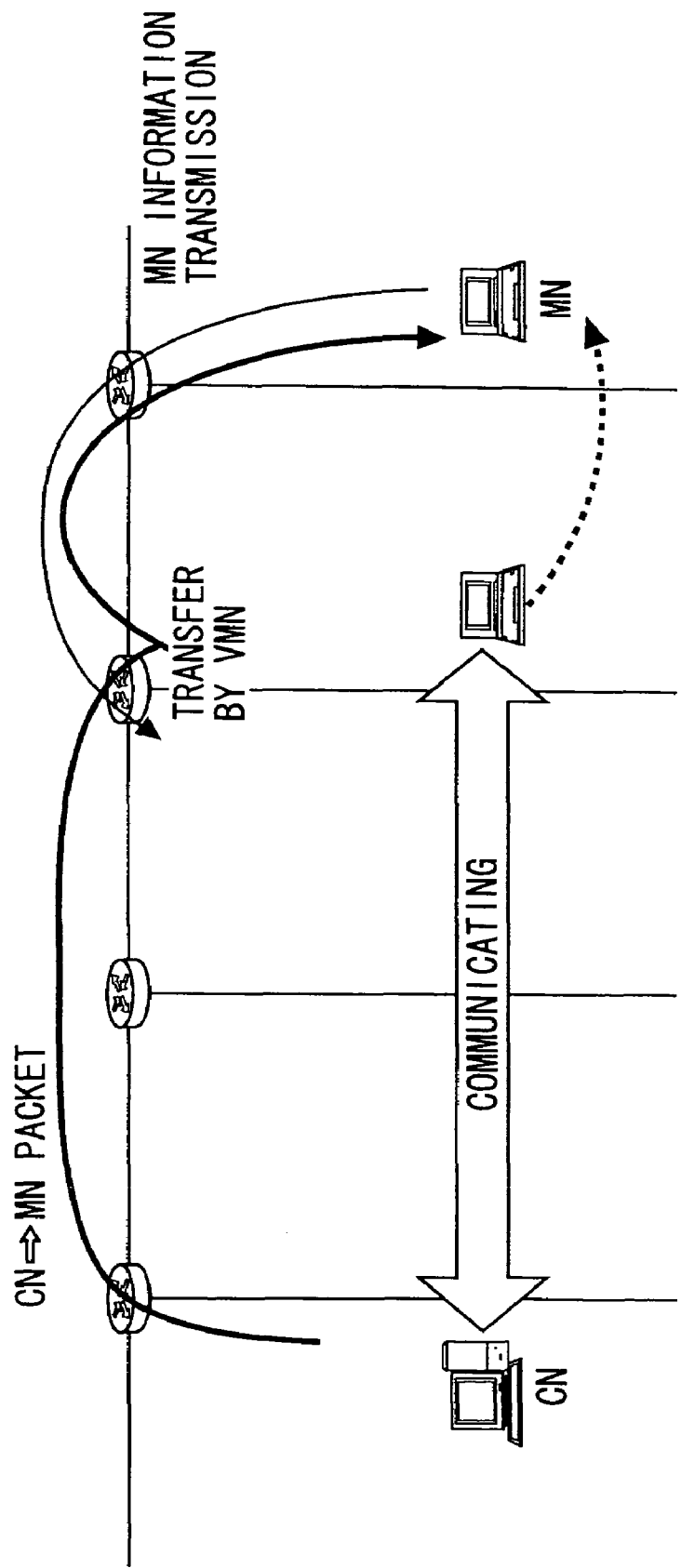
FIG. 7 is a diagram for explaining a first embodiment.

As explained above, according to the IP network system of this embodiment, when the MN 100 communicating with the CN 300 is relocated (moves) to another segment 2, the MN 100 notifies the segment 1 before movement (a specific segment) of MN information (including at least an old Care of Address and a new Care of Address). The VMN 200 located in the segment 1 before movement receives these (old Care of Address and the new Care of Address) (using the MN information receiving unit 204) and manages them (using the MN information managing unit 202). Then, the VMN 200 receives a packet addressed to the old Care of Address of the MN 100, which is transmitted from the CN 300 after the MN 100 is relocated (moves) to the another segment 2 (using the packet-addressed-to-MN receiving unit 210), and transfers this packet addressed to the old Care of Address to the new Care of Address of the MN 100 managed by the MN information managing unit 202 (using a packet transfer unit). FIG. 7 shows the series of processing. Four vertical lines represent segments.

Therefore, even after a Care of Address changes as the MN 100 is relocated (moves) to another segment, it is possible to continue communication between the MN 100 and the CN 300 not supporting the mobile IP function. For example, while the CN 300 and the MN 100 are communicating with each other using a Care of Address of the MN 100, communication can be continued without being interrupted even if the MN 100 is relocated (moves) to the another segment 2.

When the MN 100 registers a Care of Address in requesting periodical delivery to the CN 300, even if the MN 100 is located in a segment different from a segment corresponding to the Care of Address, the MN 100 can receive delivery at a movement destination.

The MN 100 notifies (the packet including) the "movement destination MN information" to the segment 1 before movement rather than the VMN 200 (indirect notification). Consequently, in this embodiment, the VMN managing unit 107 and the VMN DB 108 are unnecessary. In other words, the MN 100 can send (the packet including) the "movement destination MN information" irrespective of the existence of the VMN 200.

Note that the VMN managing unit 107 and the VMN DB 108 may be provided such that (the packet including) the "movement destination MN information" is notified to (an address of) the VMN 200 managed by the VMN managing unit 107 and the VMN DB 108 (direct notification). Consequently, even when transmission of MN information is necessary in order to continue communication with the CN 300, the MN 100 does not transmit the MN information when the VMN 200 is not present. Therefore, transmission of a redundant packet is inhibited.

Second Embodiment

Next, an IP network system, which is a second embodiment of the present invention, will be explained with reference to FIG. 8.

The IP network system of this embodiment is substantially the same as that in the first embodiment. However, a notification destination segment of a packet including movement destination MN information is different. In the first embodiment, the MN 100 notifies a segment before movement of the "movement destination MN information". However, in this embodiment, the MN 100 notifies a segment, in which the CN 300 is located, of the "movement destination MN information".

In an example to be explained below with reference to FIG. 8 and the like, the MN 100 located in the segment 3 starts communication with the CN 300 located in the segment 1 and the MN 100 continues the communication even after the MN 100 is relocated (moves) to a segment 4.

(Establishment of Connection)

Processing until the MN 100 located in the segment 3 establishes connection with the CN 300 located in the segment 1 is the same as the processing explained in the first embodiment (S100 to S106). With the processing, connection is established between a Care of Address 3 of the MN 100 and an address of the CN 300.

Note that the MN 100 manages "communication destination information", which is information on the CN 300, using the communication destination managing unit 105 regardless of whether the CN 300, which is a communication destination, is compatible to the mobile IP function. The MN 100 registers communication destination information including prefix information of the CN 300, which becomes a communication partner, in an area corresponding to a destination address of the communication destination information DB 106 using the communication destination managing unit 105 when the MN 100 starts communication.

(Transfer Destination Address Registration Processing; MN Side Processing)

Figure 8:
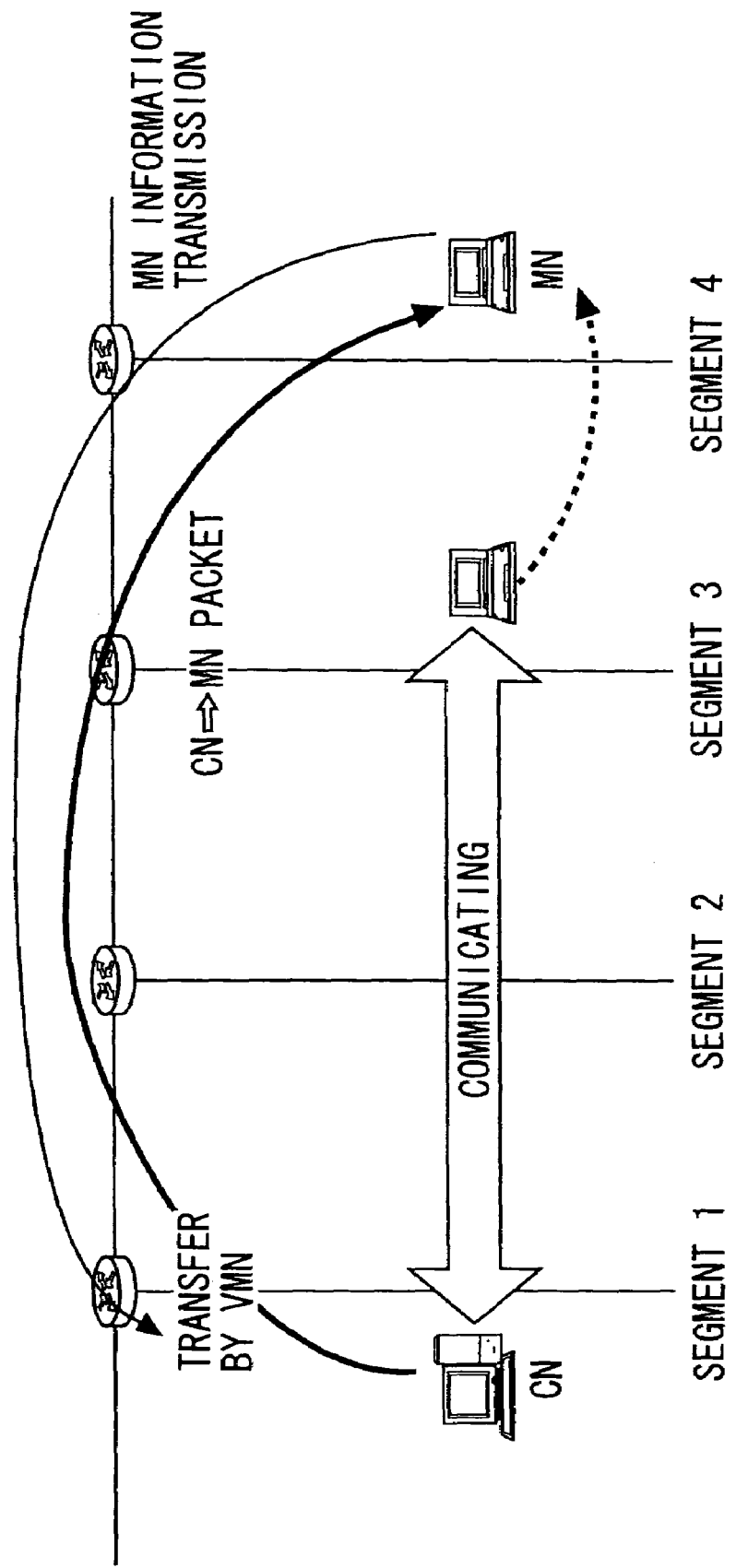
FIG. 8 is a diagram for explaining a second embodiment.

It is assumed that, after the connection is established, the MN 100 is relocated (moves) from the segment 3 to the segment 4 (another segment) (S107, FIG. 8). In this case, the same processing as the processing explained in the first embodiment (S108 and S109) is executed.

When the MN 100 (the movement detecting unit 101) detects that the MN 100 itself has been relocated (has moved) to another segment (the segment 4), the MN 100 generates the Care of Address 4 on the basis of a prefix or the like included in a Routing Advertisement notified to the segment 2 and resets the Care of Address 4 as an IPv6 address of the MN 100 itself.

Specifically, the MN 100 registers the generated Care of Address 4 or the like in the MN information DB 102 (S108).

Thereafter, in the first embodiment, the MN 100 notifies a segment before movement of "movement destination MN information". However, in this embodiment, the MN 100 notifies a segment, in which the CN 300 is located, (the segment 1 in this context) of "movement destination MN information" (S111). The movement destination MN information includes a Care of Address 4 (hereinafter referred to as new Care of Address 4), the Care of Address 3 before movement (hereinafter referred to as old Care of Address 3), a prefix length, and effective time. These are registered in the MN information DB 102.

The MN 100 generates an address to the segment 1, in which the CN 300 is located, on the basis of a prefix of an address of the CN 300 (a prefix obtained from the communication destination information DB 106 or the like) (S110*d*) and sets this address as a destination address of a packet including this movement destination MN information. Then, the MN 100 sets the old Care of Address 3 (a presently notified Care of Address obtained from the communication destination information DB 106 or the like), with which the MN 100 is communicating with the CN 300, as information equivalent to a Home address of movement destination information notification (BU/Reg-Req) to an HA (S110*e*). In addition, the MN 100 sets the same information as the movement destination information notification (BU/Reg-Req) to the HA in the new Care of Address 4, the effective time, and the like (S110*f*).

When the MN 100 transmits MN information, the MN 100 updates the presently notified Care of Address of the communication destination information DB 106 and adds information corresponding to the Care of Address notified to the segment 1, in which the CN 300 is located, to the MN information DB 102.

The MN 100 sends the packet edited as described above in anycast (i.e., sends the packet to the segment in which the CN 300 is located) using the MN information notifying unit 109. Consequently, the old Care of Address 3, the new Care of Address 4, the effective time, and the like are notified to the segment 1 in which the CN 300 is located.

(Transfer Destination Address Registration Processing; VMN Side Processing)

The VMN 200 located in the segment 1 receives (a packet including) "movement destination MN information" notified from the MN 100 using the MN information receiving unit 204 (S200) Thereafter, the same processing as the processing explained in the first embodiment (S201 to S210) is executed.

The VMN 200 receives this packet and, after that, transfers a packet addressed to the MN, which is received through the VMN 200 or using the packet-addressed-to-MN receiving unit 201, to the new Care of Address 4 of the MN 100 using the packet transfer unit 206.

As explained above, according to the IP network system in this embodiment, when the MN 100 communicating with the CN 300 is relocated (moves) to another segment 4, the MN 100 notifies the segment 1 (the specific segment), in which the CN 300 is located, of MN information (including at least an old Care of Address and a new Care of Address). The VMN 200 located in the segment 1, in which the CN 300 is located, receives these (old Care of Address and the new Care of Address) (using the MN information receiving unit 204) and manages these (using the MN information managing unit 202). Then, the VMN 200 receives a packet addressed to the old Care of Address, which is sent from the CN 300 after the MN 100 is relocated (moves) to the another segment (the segment 4), (using the packet-addressed-to-MN receiving unit 201) and transfers this packet addressed to the old Care of Address to the new Care of Address managed by the MN information managing unit 202 (using the packet transfer unit). FIG. 8 shows the series of processing. Four vertical lines represent segments.

Therefore, even after a Care of Address changes as the MN 100 is relocated (moves) to another segment, it is possible to continue communication between the MN 100 and the CN 300 not supporting the mobile IP function. For example, while the CN 300 and the MN 100 are communicating with each other using a Care of Address of the MN 100, communication can be continued without being interrupted even if the MN 100 is relocated (moves) to the another segment (the segment 4).

When the MN 100 registers a Care of Address in requesting periodical delivery to the CN 300, even if the MN 100 is located in a segment different from a segment corresponding to the Care of Address, the MN 100 can receive the delivery at a movement destination.

In addition, in these cases, the CN 300 can send a packet to the MN 100 irrespective of a movement destination of the MN 100 and not through a redundant path. The MN 100 can continue the communication and receive services or the like continuously.

Third Embodiment

Next, an IP network system, which is a third embodiment of the present invention, will be explained with reference to FIG. 9.

The IP network system of this embodiment is substantially the same as that in the first embodiment. However, a notification destination segment of a packet including movement destination MN information is different. In this embodiment, the MN 100 notifies a segment, which has started communication with the CN 300, (i.e., a segment in which the MN 100 is located when the communication is started) of "movement destination MN information".

In an example to be explained below with reference to FIG. 9 and the like, the MN 100 located in the segment 2 starts communication with the CN 300 located in the segment 1 and continues the communication even after the MN 100 is relocated (moves) to the segment 4 through the segment 3.

(Establishment of Connection)

Processing until the MN 100 located in the segment 2 establishes connection with the CN 300 located in the segment 1 is the same as the processing explained in the first embodiment (S100 to S106). With the processing, connection is established between a Care of Address 2 of the MN 100 and an address of the CN 300.

(Transfer Destination Address Registration Processing; MN Side Processing)

Figure 9:
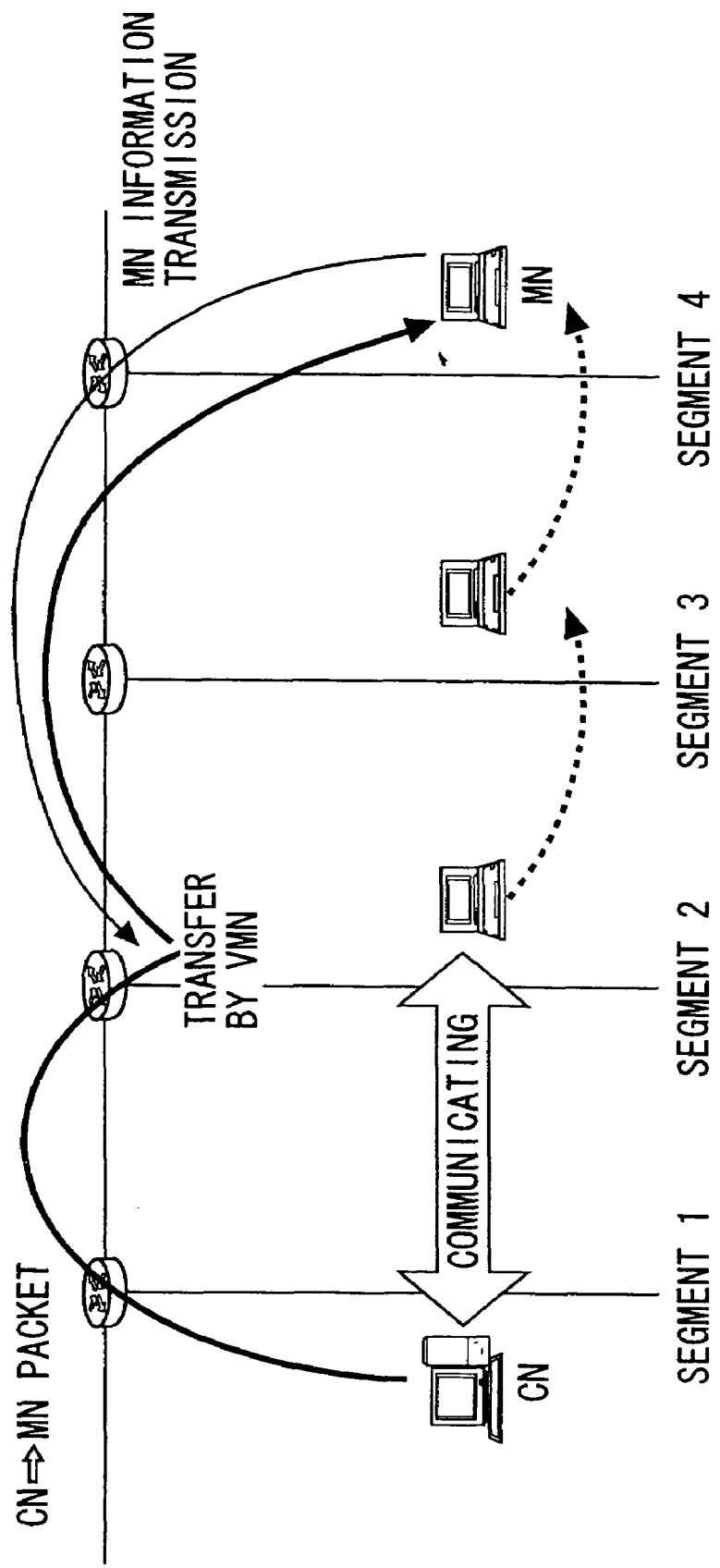
FIG. 9 is a diagram for explaining a third embodiment.

It is assumed that, after the connection is established, the MN 100 is relocated (moves) from the segment 2 to the segment 4 (another segment) through the segment 3 (S107, FIG. 9). In this case, the same processing as the processing explained in the first embodiment (S108 and S109) is executed.

When the MN 100 (the movement detecting unit 101) detects that the MN 100 itself has been relocated (has moved) to the another segment (the segment 4), the MN 100 generates the Care of Address 4 on the basis of a prefix or the like included in a Routing Advertisement notified to the segment 4 and resets the Care of Address 4 as an IPv6 address of the MN 100 itself.

More specifically, the MN 100 registers the generated Care of Address 4 or the like in the MN information DB 102 (S108)

Thereafter, in the first embodiment, the MN 100 notifies a segment before movement of "movement destination MN information". However, in this embodiment, the MN 100 notifies a segment, in which the MN 100 is located when communication with the CN 300 is started, (the segment 2 in this context) of "movement destination MN information" (S111) The movement destination MN information includes the Care of Address 4 (hereinafter referred to as new Care of Address 4), the Care of Address 2 at the time when communication with the CN 300 is started (hereinafter referred to as old Care of Address 2), a prefix length, and effective time. These are registered in the MN information DB 102.

The MN 100 generates an address to the segment 2, in which the MN 100 is located when communication with the CN 300 is started, on the basis of a prefix of the Care of Address 2 at the time when communication with the CN 300 is started (a prefix obtained from the communication destination information DB 106 or the like) (S110g) and sets this address as a destination address of a packet including this movement destination MN information. Then, the MN 100 sets the old Care of Address 2 at the time when communication with the CN 300 is started (a Care of Address at communication start time obtained from the communication destination information DB 106 or the like: equivalent to the old Care of Address 1) as information equivalent to a Home address of movement destination information notification (BU/Reg-Req) to an HA (S110h). In addition, the MN 100 sets the same information as the movement destination information notification (BU/Reg-Req) to the HA in the new Care of Address 4, the effective time, and the like (S110i).

When the MN 100 transmits MN information, the MN 100 updates the presently notified Care of Address of the communication destination information DB 106 and adds information corresponding to the Care of Address notified to the segment 2, in which the MN 100 is located when communication with the CN 300 is started, to the MN information DB 102.

The MN 100 sends the packet edited as described above in anycast (i.e., sends the packet to the segment in which the MN 100 is located when communication with the CN 300 is started) using the MN information notifying unit 109. Consequently, the old Care of Address 2, the new Care of Address 4, the effective time, and the like are notified to the segment 2 in which the MN 100 is located when communication with the CN 300 is started.

(Transfer Destination Address Registration Processing; VMN Side Processing)

The VMN 200 located in the segment 2 receives (a packet including) "movement destination MN information" notified from the MN 100 using the MN information receiving unit 204 (S200). Thereafter, the same processing as the processing explained in the first embodiment (S201 to S210) is executed.

The VMN 200 receives this packet and, after that, transfers a packet addressed to the MN, which is received through the VMN 200 or using the packet-addressed-to-MN receiving unit 201, to the new Care of Address 4 of the MN 100 using the packet transfer unit 206.

As explained above, according to the IP network system of this embodiment, when the MN 100 communicating with the CN 300 is relocated (moves) to another segment (the segment 4) the MN 100 notifies the segment 2 (a specific segment), in which the MN 100 is located when communication with the CN 300 is started, of MN information (including at least an old Care of Address and a new Care of Address). The VMN 200 located in the segment 2, in which the MN 100 is located when communication with the CN 300 is started, receives these (old Care of Address and the new Care of Address) (using the MN information receiving unit 204) and manages these (using the MN information managing unit 202). Then, the VMN 200 receives a packet addressed to the old Care of Address, which is transmitted from the CN 300 after the MN 100 is relocated (moves) to the another segment (the segment 4), (using the packet-addressed-to-MN receiving unit 210) and transfers this packet addressed to the old Care of Address to the new Care of Address managed by the MN information managing unit 202 (using the packet transfer unit). FIG. 9 shows the series of processing. Four vertical lines represent segments.

Therefore, even after a Care of Address changes as the MN 100 is relocated (moves) to another segment, it is possible to continue communication between the MN 100 and the CN 300 not supporting the mobile IP function. For example, while the CN 300 and the MN 100 are communicating with each other using a Care of Address of the MN 100, communication can be continued without being interrupted even if the MN 100 is relocated (moves) to the another segment (the segment 4). In addition, when the MN 100 registers a Care of Address in requesting periodical delivery to the CN 300, even if the MN 100 is located in a segment different from a segment corresponding to the Care of Address, the MN 100 can receive delivery at a movement destination.

In these cases, the CN 300 can send a packet to the MN 100 irrespective of a movement destination of the MN 100. The MN 100 can continue the communication and receive services or the like continuously.

Fourth Embodiment

Figure 10:
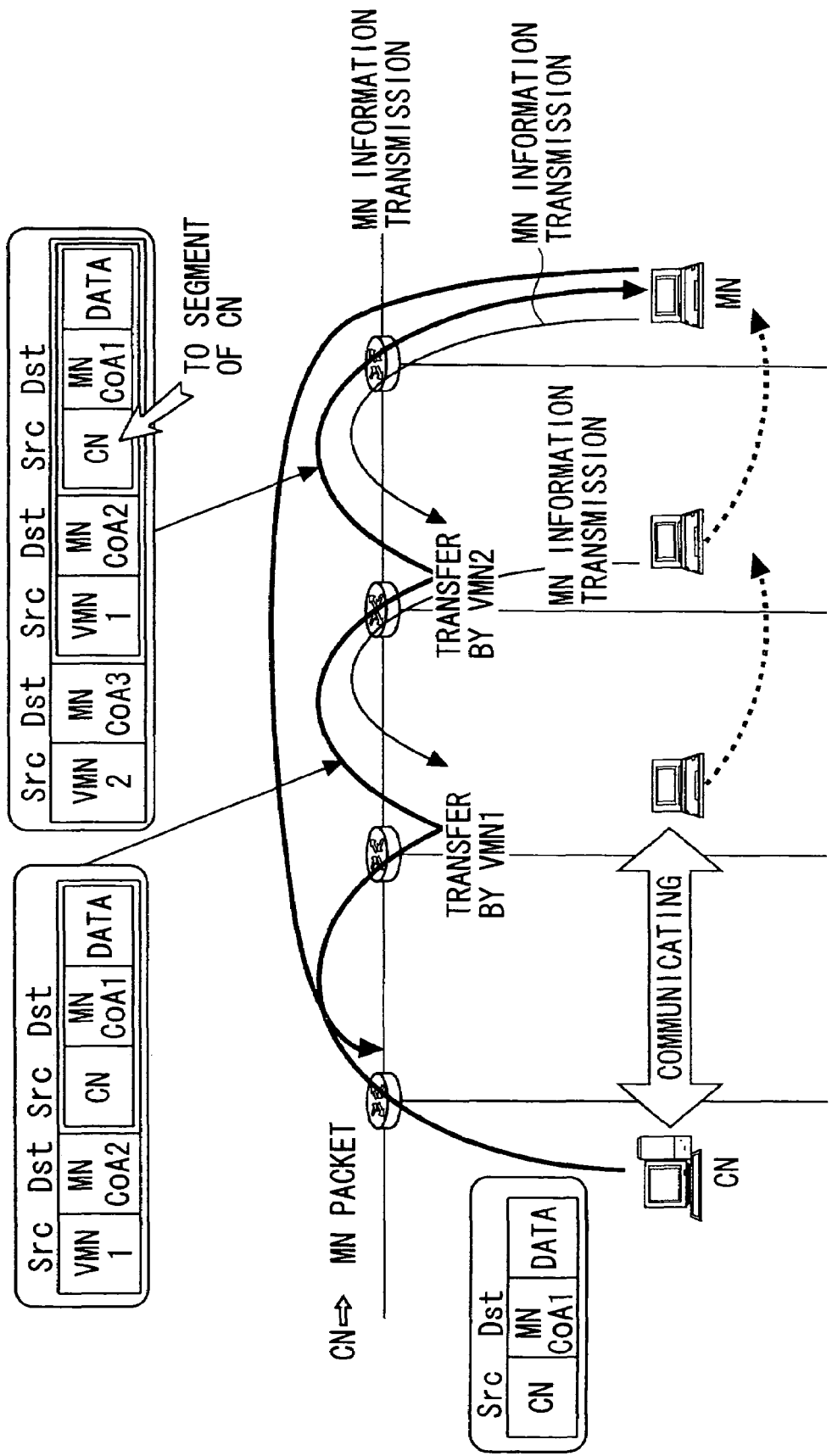
FIG. 10 is a diagram for explaining a fourth embodiment.

Next, an IP network system, which is a fourth embodiment of the present invention, will be explained with reference to FIG. 10.

The IP network system of this embodiment is substantially the same as that in the first embodiment. However, a notification destination segment of a packet including movement destination MN information is different. In this embodiment, the MN 100 extracts a source address (indicated by a CN pointed by an arrow in FIG. 10) from a base packet (a packet before encapsulation) of a multiple encapsulated packet received from the CN 300 (using the packet analyzing unit 104) and specifies a prefix of a transmission source segment of the base packet from prefix length of this extracted source address and a Care of Address of the MN 100 itself.

Then, the MN 100 notifies the specified transmission source segment of the base packet of the "movement destination MN information".

The MN 100 generates an address to the transmission source segment as a destination address of a packet including this movement destination MN information on the basis of the specified prefix of the transmission source segment of the base packet and sets this address as a destination address. Then, as in the embodiment described above, the MN 100 sets a new Care of Address and an old Care of Address. The MN 100 sends the packet edited as described above in anycast (i.e., sends the packet to the segment in which the transmission source of the base packet is located) using the MN information notifying unit 109. Consequently, the old Care of Address, the new Care of Address, the effective time, and the like are notified to the transmission source segment of the base packet.

Thereafter, the same processing as the processing (S201 to S210) explained in the first embodiment is executed.

As explained above, according to the IP network system of this embodiment, even when the MN 100 does not perform movement detection and management of the CN 300, it is possible to notify an appropriate VMN 200 of movement destination MN information. Therefore, the movement detecting unit 101 and the like are unnecessary.

Fifth Embodiment

Figure 11:
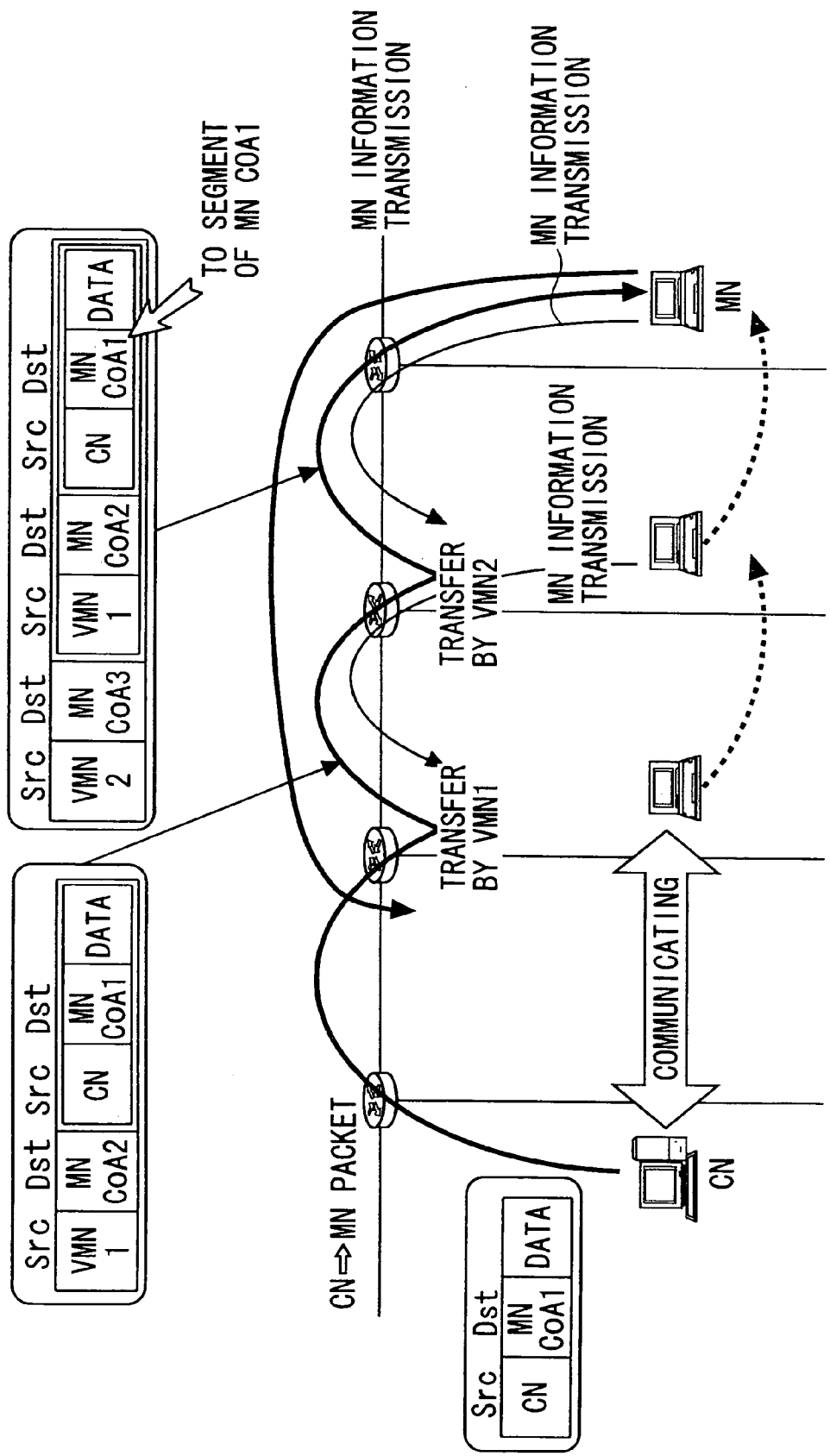
FIG. 11 is a diagram for explaining a fifth embodiment.

Next, an IP network system, which is a fifth embodiment of the present invention, will be explained with reference to FIG. 11.

The IP network system of this embodiment is substantially the same as that in the first embodiment. However, a notification destination segment of a packet including movement destination MN information is different. In this embodiment, the MN 100 extracts a source address (indicated by a MN CoA1 pointed by an arrow in FIG. 11) from a base packet (a packet before encapsulation) of a multiple encapsulated packet received from the CN 300 (using the packet analyzing unit 104) and specifies a prefix of a transmission source segment of the base packet from prefix length of this extracted source address and a Care of Address of the MN 100 itself.

Then, the MN 100 notifies the specified destination segment of the base packet of the "movement destination MN information".

The MN 100 generates an address to the destination segment, as a destination address of a packet including this movement destination MN information, on the basis of the specified prefix of the destination segment of the base packet and sets this address as a destination address. Then, as in the embodiment described above, the MN 100 sets a new Care of Address and an old Care of Address. The MN 100 sends the packet edited as described above in anycast (i.e., sends the packet to the transmission source segment of the base packet) using the MN information notifying unit 109. Consequently, the old Care of Address, the new Care of Address, the effective time, and the like are notified to the transmission source segment of the base packet.

Thereafter, the same processing as the processing (S201 to S210) explained in the first embodiment is executed.

As explained above, according to the IP network system of this embodiment, even when the MN 100 does not perform movement detection and management of the CN 300, it is possible to notify an appropriate VMN 200 of movement destination MN information. Therefore, the movement detecting unit 101 and the like are unnecessary.

Sixth Embodiment

Next, an IP network system, which is a sixth embodiment of the present invention, will be explained.

This embodiment is characterized by including processing in which the MN 100 acquires a VMN address (VMN information) with some method, holds the VMN address (using the VMN DB 108), and specifies an appropriate VMN 200 at the time of MN information transmission, without performing the processing (the generation of a VMN address) in S110 explained in the first to the fifth embodiment. It is possible to use this processing in place of S110 explained in the first to the fifth embodiment. Hereafter, this processing will be explained with reference to FIG. 12 or the link.

As a method for allowing the MN 100 to hold VMN information, there are static storing method of registering the VMN information according to a command or the like and a method of dynamically storing the VMN information on the basis of information or the like to be received. The methods of dynamically storing the VMN information include a passive method of receiving information notified from the VMN 200 and an active method with which the MN 100 inquires. Here, a method with which the MN 100 receives VMN information notified by the VMN 200 using the VMN information advertising unit 205 and registers the VMN information in the VMN information DB 108 will be described as an example.

Figure 12B:
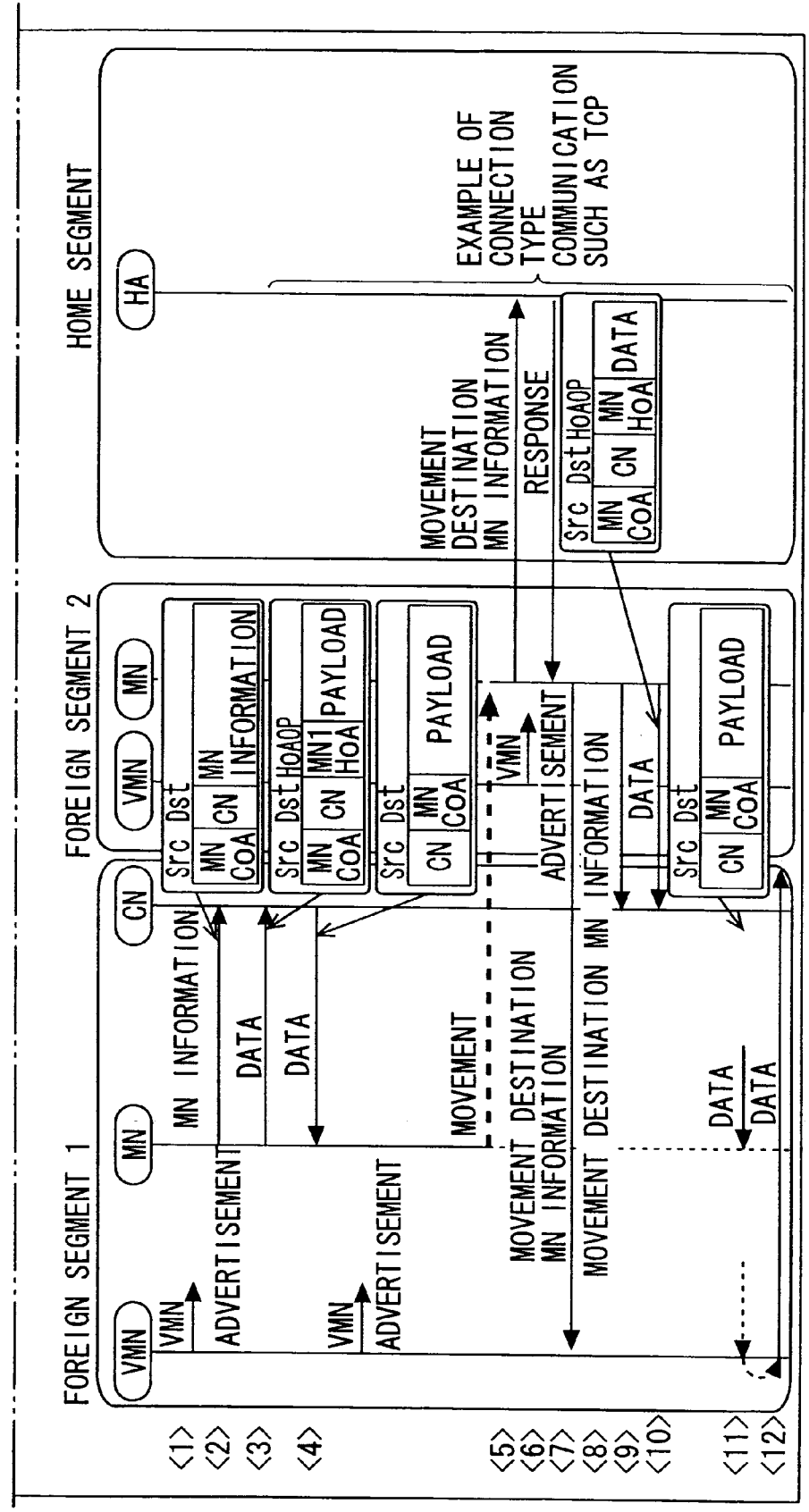
FIG. 12 (FIGS. 12A and 12B) is a diagram for explaining a sixth embodiment.
Figure 13:
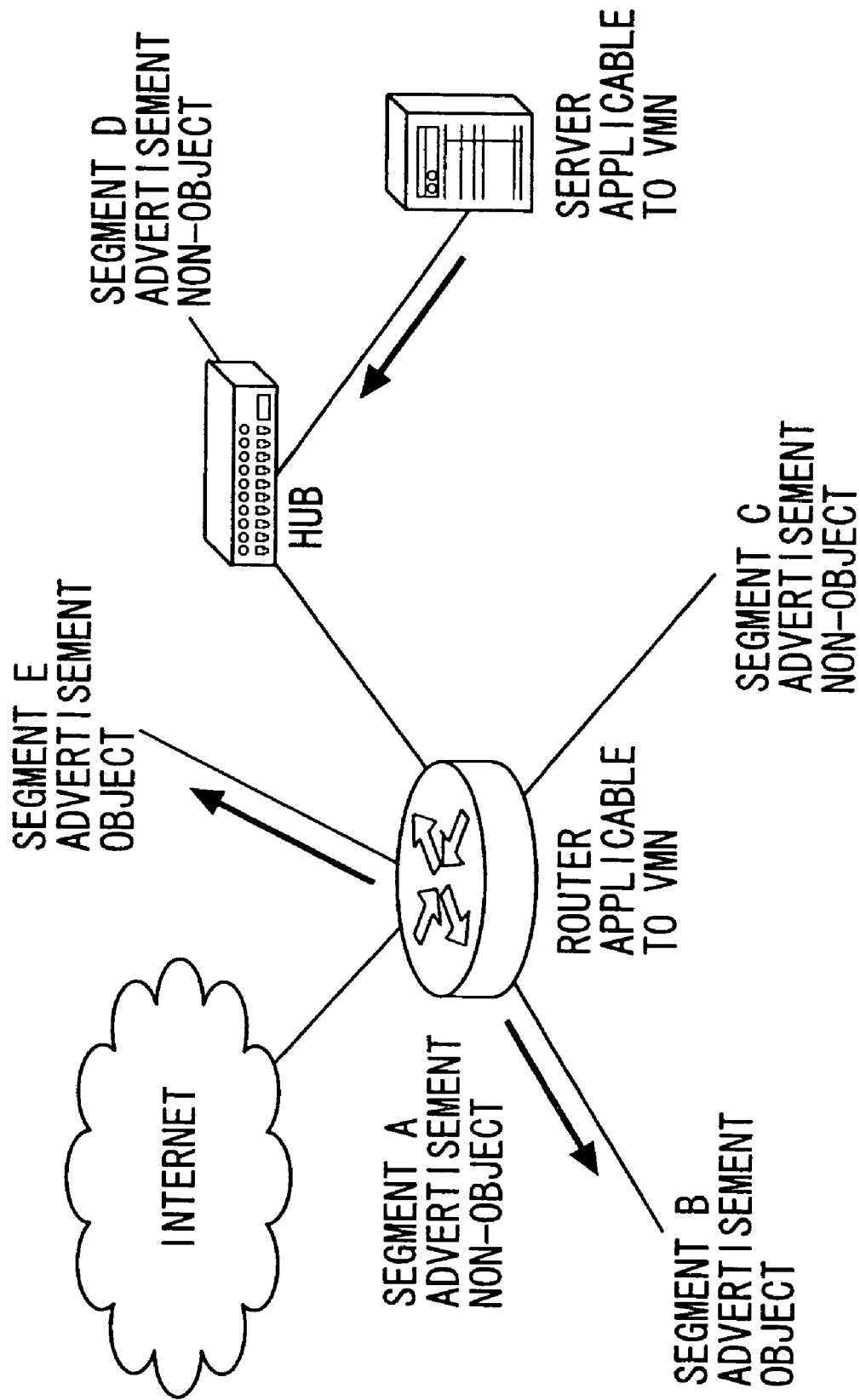
FIG. 13 is a diagram for explaining an example of notification of a VMN advertisement by the VMN.
Figure 14:
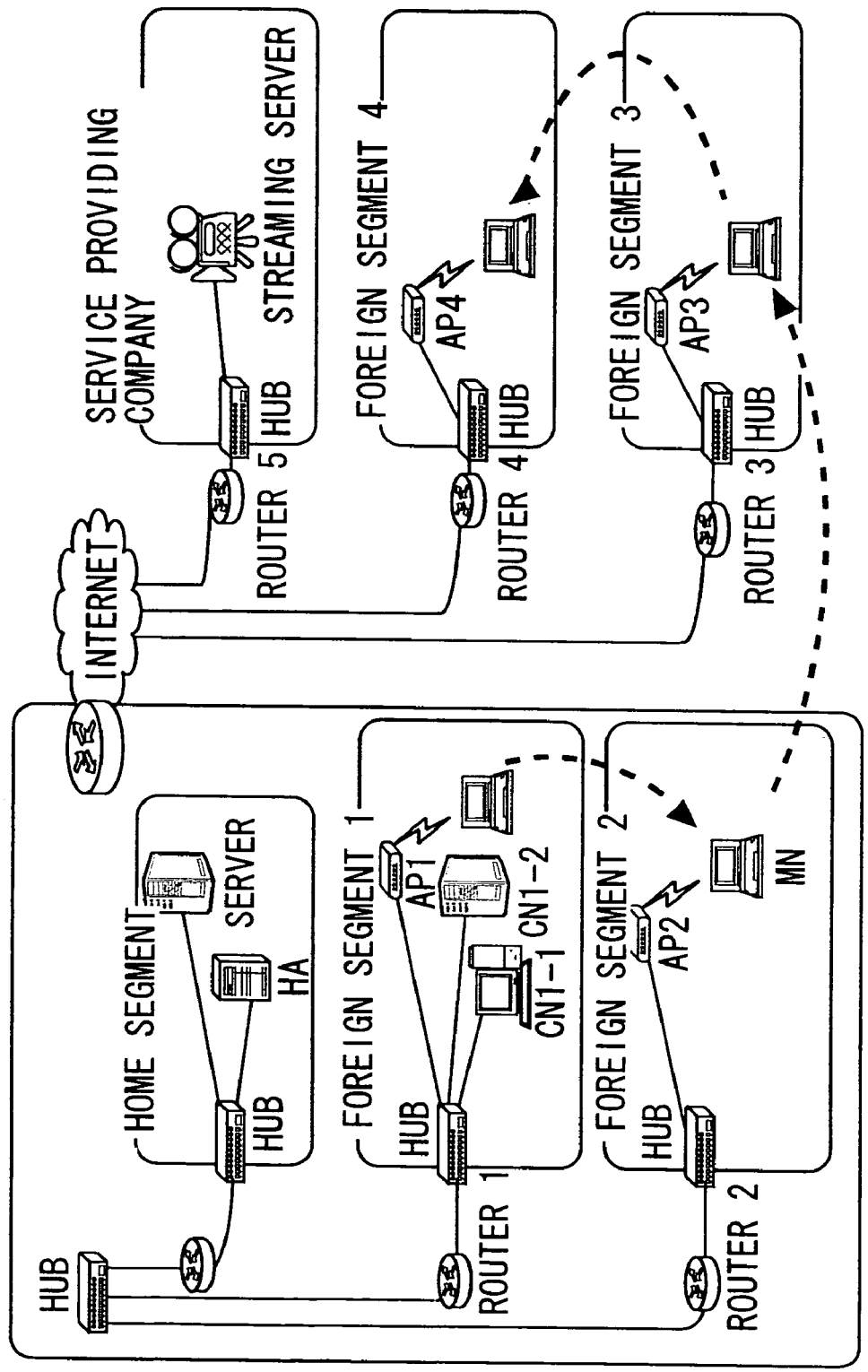
FIG. 14 is a diagram for explaining a schematic system configuration of a conventional IP network system.

The VMN 200 notifies segments requiring notification of the VMN information among segments to which the VMN 200 itself belongs (see FIG. 13) of an "own address" a "prefix length", "effective time", and the like (<1> in FIG. 12).

The MN 100 receives the VMN information and registers the received "VMN information" in the VMN DB 108 using the VMN managing unit 107.

When the MN 100 detects that the MN 100 itself has been relocated (has moved) to another segment, the MN 100 transmits "MN information" to the VMN 200 registered in the VMN DB 108 (<8> in FIG. 12).

The VMN 200 receives the MN information. When the VMN 200 detects a packet coinciding with the received "MN information", the VMN 200 sends the packet to a movement destination. In other words, the same processing as the processing (S201 to S210) explained in the first embodiment is executed.

Seventh Embodiment

Next, an IP network system, which is a seventh embodiment of the present invention, will be explained.

The IP network system in this embodiment is substantially the same as that in the first embodiment. However, this embodiment is characterized by including processing for dividing "(a VMN) of a segment to which a CN belongs" and "(a VMN) of a segment to which MN information is transmitted directly from a CN" as transmission destinations of MN information.

When the MN 100 and the CN 300 located in an identical segment start communication, a "segment to which the CN 300 belongs" and a "segment to which MN information is transmitted directly from the CN 300" are identical, so identical information is obtained when a transmission destination is determined. Thus, it is unnecessary to selectively use any one of the segments.

A case in which it is necessary to divide segments (use segments selectively) will be described below.

For example, the MN 100 is conscious of a network structure and transmits MN information to a "CN segment" and a "transmission source segment" only when the VMN 200 is a router type node. When the VMN 200 is a node of the other types or when a type of the VMN 200 cannot be determined, the MN 100 includes unit for transmitting MN information to a "segment that has started communication" and a "destination segment".

When the MN 100 temporarily transmits MN information to the "CN segment" and the "transmission source segment" and receives plural identical packets from the "CN segment" and the "transmission source segment" and other segments, the MN 100 includes unit for judging that the VMN 200 of the "CN segment" and the "transmission source segment" is the server type node, transmitting a MN information deletion notification to the "CN segment" and the "transmission source segment", and transmitting MN information to the segments regarding that the VMN 200 of the segments is the server type node after that.

The MN 100 includes unit for storing, when the MN 100 holds VMN information, information about whether the VMN is a server type node or a router type node.

The MN 100 includes unit for transmitting MN information to the VMN 200 only in the case where the VMN 200 corresponding to the "CN segment" and the "transmission source segment" is the router type node, and in other cases, transmitting the MN information to a VMN corresponding to the "segment that has started communication" and the "destination segment".

Note that it is possible to transmit MN information to both the "segment to which the CN 300 belongs" and the "segment to which MN information is transmitted directly from the CN 300". However, it is unnecessary to hold information in a VMN that is not used and a packet transmission for that purpose results in a network load.

Thus, in order to transmit MN information to a "segment to which a CN belongs" or the "VMN 200 located in the segment", it is effective that a target VMN is the router type node or a segment in which a MN has started communication with a CN is the same as a segment to which the CN belongs.

However, taking into account a transfer of a data packet, it is possible to establish a more effective packet transfer path by transmitting MN information to the "segment to which a CN belongs".

An operation for dividing segments will be explained simply below.

<1> When the MN 100 cannot identify an attribute (the router type or the server type) of a VMN of the "segment to which the CN 300 belongs", the MN 100 receives a reply from the VMN 200 in response to "VMN information" transmitted to the segment. The VMN 200 sets a VMN attribute in received information, whereby the MN 100 identifies the attribute.

<2> When the attribute is the server type, the MN 100 notifies the VMN 200 of deletion of MN information and transmits again the MN information to the "segment to which MN information is transmitted directly from the CN 300".

<3> After that, the MN holds the information while the information is effective.

On the other hand, when the MN 100 can identify an attribute (the router type or the server type) of a VMN of the "segment to which the CN 300 belongs", the MN 100 acquires communication destination information from the communication destination information DB 106 using the communication destination managing unit 105 at the time of transmission of "MN information". In addition, the MN 100 sends an inquiry to the VMN managing unit 107 from the MN information notifying unit 109 and acquires transmission destination VMN information.

If an attribute of a VMN corresponding to a communication destination is the router type and the VMN and the communication destination are in an identical segment, the MN 100 notifies the VMN of the "MN information".

On the other hand, if an attribute of a VMN corresponding to a communication destination is the router type but the VMN and the communication destination are not in an identical segment, the MN 10 does not notify the VMN of the "MN information".

When an attribute of a VMN corresponding to a communication destination is the server type, the VMN and the communication destination are in an identical segment, and a VMN of the router type is not present in the segment, the MN 100 notifies the VMN of the "MN information". If the VMN and the communication destination are not in an identical segment, the MN 100 transmits the "MN information" to the VMN. Otherwise, the MN 100 does not transmit the "MN information".

It is possible to carry out the present invention in other various forms without departing from the spirit and the main characteristics of the present invention. Therefore, the embodiments described above are only examples in every respect and should not be interpreted restrictively.

INDUSTRIAL APPLICABILITY

As explained above, according to the present invention, it is possible to prevent a situation in which, since a destination of a packet to be sent from a CN to a MN is changed to an old CoA of the MN following segment movement of the MN, the packet does not reach the MN after the movement, and communication is interrupted. In other words, the CN and the MN can communicate with each other using a Care of Address (CoA) different from a present Care of Address (CoA) of the MN as an address of the MN. For example, when the MN moves from one segment to another in a state in which the MN and the CN is communicating with each other using a Care of Address (CoA) of the MN, the MN can continue the communication and can perform mutual communication not through a redundant path.

All IP network connection devices do not always have to be implemented with the mobile IP function. Even if the mobile IP function is not implemented to the IP network communication devices, the IP network communication devices do not need to perform reconnection processing in consideration of an end of communication following movement of a partner or a movement destination of the partner. This makes it easy to maintain connection and makes it unnecessary to give consideration to movement of a communication partner.

Adaptation to the IP of a communication network is promoted according to the e-Japan scheme and the like. A streaming broadcast and various services compatible to the IP are being widespread. In addition, since adaptation to the IP and sophistication of functions of mobile terminals are also promoted, the mobile terminals can receive the streaming broadcast and the various services.

In such a change in the environment, a server at a service providing source does not always support the mobile IP function. A network adopting the present invention can provide services continuously regardless of whether a mobile terminal moves. Considering spread of an IP network, adaptation of mobile terminals to the IP, expansion of mobility of IP terminals, and the like in future, the present invention is necessary to improve serviceability.

What is claimed is:

1. A network system including a network divided into a plurality of segments, a MN (Mobile Node) that sets a Care of Address for each segment in which the MN is located, a CN (Corresponding Node) being a communication partner of the MN, and a VMN (Virtual Mobile Node) being provided in specific segment of the plurality of segments, the network system comprising:

in the MN
- a packet analyzing unit extracting a source address or a destination address from a base packet of a multiple encapsulated packet received from the CN; and
- a MN information notifying unit transmitting MN information including an old Care of Address set in a segment before movement of the MN to the specific segment and a new Care of Address set in another segment after movement of the MN to the specific segment in which a transmission source according to the source address extracted by the packet analyzing unit is located or in which a transmission destination according to the destination address extracted by the packet analyzing unit is located, and in the VMN
- a Care of Address managing unit managing the new Care of Address and the old Care of Address included in the MN information transmitted from the MN information notifying unit;
- a packet receiving unit receiving a packet addressed to the old Care of Address at least after the MN is relocated to the another segment, the packet being transmitted from the CN; and
- a packet transfer unit transferring the packet addressed to the old Care of Address to the new Care of Address managed by the Care of Address managing unit, the packet addressed to the old Care of Address being received by the packet receiving unit.

2. A network system according to claim 1, wherein the MN information notifying unit transmits the MN information to a segment in which the CN is located or to a segment in which the MN is located when starting to communicate with the CN.

3. A network system according to claim 1, wherein
the MN further includes a packet analyzing unit extracting a source address and a destination address from a base packet of a multiple encapsulated packet received from the CN, and
the MN information notifying unit transmits the MN information to a segment in which a transmission source according to the source address extracted by the packet analyzing unit is located or to a segment in which a transmission destination is located.

4. A network system including a network divided into a plurality of segments, a MN (Mobile Node) that sets a Care of Address for each segment in which the MN is located, a CN (Corresponding Node) being a communication partner of the MN, and a VMN (Virtual Mobile Node) being provided in a specific segment of the plurality of segments, the network system comprising:

in the MN
- a managing unit managing VMN information including at least an address of the VMN;
- a movement detecting unit detecting that the MN is relocated to the another segment;
- a packet analyzing unit extracting a source address or a destination address from a base packet of a multiple encapsulated packet received from the CN; and
- a MN information notifying unit transmitting MN information including an old Care of Address set in a segment before movement of the MN and a new Care of Address set in another segment after movement of the MN to a specific VMN managed by the managing unit when the movement detecting unit detects that the MN itself is relocated to the another segment, wherein the specific VMN is a VMN located in a segment identical with a segment in which a transmission source according to the source address extracted by the packet analyzing unit is located or in which a transmission destination according to the destination address extracted by the packet analyzing unit is located, and in the VMN
- a Care of Address managing unit managing the new Care of Address and the old Care of Address included in the MN information transmitted from the MN information notifying unit;
- a packet receiving unit receiving a packet addressed to the old Care of Address at least after the MN is relocated to the another segment, the packet being transmitted from the CN; and
- a packet transfer unit transferring the packet addressed to the old Care of Address to the new Care of Address managed by the Care of Address managing unit, the packet addressed to the old Care of Address being received by the packet receiving unit.

5. A network system according to claim 4, wherein the MN information notifying unit transmits the MN information to a VMN, which is located in a segment identical with a segment in which the CN is located, or to a VMN, which is located in a segment in which the MN is located when starting to communicate with the CN, both of the VMNs being managed by the managing unit.

6. A network system according to claim 4, wherein
the MN further includes a packet analyzing unit extracting a source address and a destination address from a base packet of a multiple encapsulated packet received from the CN, and
the MN information notifying unit transmits the MN information to a VMN, which is located in a segment identical with a segment in which a transmission source according to the source address extracted by the packet analyzing unit is located, or to a VMN, which is located in a segment identical with a segment in which a transmission destination is located, both of the VMNs being managed by the managing unit.

* * * * *

UNITED STATES PATENT AND TRADEMARK OFFICE
CERTIFICATE OF CORRECTION

| | |
|---|---|
| PATENT NO. | : 7,515,590 B2 |
| APPLICATION NO. | : 11/237715 |
| DATED | : April 7, 2009 |
| INVENTOR(S) | : Kazuhiro Muraoka et al. |

It is certified that error appears in the above-identified patent and that said Letters Patent is hereby corrected as shown below:

First Page, Column 2 (Abstract), Line 3, change "address" to --Address--.

Column 23, Line 6, after "in" insert --a--.

Signed and Sealed this

Thirtieth Day of June, 2009

JOHN DOLL
*Acting Director of the United States Patent and Trademark Office*